US011772045B2

(12) United States Patent
Jouni et al.

(10) Patent No.: US 11,772,045 B2
(45) Date of Patent: Oct. 3, 2023

(54) AIR PURIFIER APPARATUS

(71) Applicants: Bassel Jouni, Rennes (FR); Bilal Jouni, Rennes (FR)

(72) Inventors: Bassel Jouni, Rennes (FR); Bilal Jouni, Rennes (FR)

(*) Notice: Subject to any disclaimer, the term of this patent is extended or adjusted under 35 U.S.C. 154(b) by 396 days.

(21) Appl. No.: 16/851,342

(22) Filed: Apr. 17, 2020

(65) Prior Publication Data

US 2021/0106947 A1 Apr. 15, 2021

Related U.S. Application Data

(60) Provisional application No. 62/915,225, filed on Oct. 15, 2019.

(51) Int. Cl.
*B01D 53/84* (2006.01)
*F25B 21/02* (2006.01)
(Continued)

(52) U.S. Cl.
CPC ........... *B01D 53/84* (2013.01); *B01D 5/0015* (2013.01); *B01D 53/0431* (2013.01); *B01D 53/265* (2013.01); *B01D 53/30* (2013.01); *F25B 21/02* (2013.01); *A01G 27/00* (2013.01); *B01D 2253/102* (2013.01); *B01D 2257/708* (2013.01);
(Continued)

(58) Field of Classification Search
CPC .. B01D 53/0431; B01D 53/265; B01D 53/30; B01D 53/34; B01D 53/346; B01D 53/74; B01D 53/84; B01D 53/85; B01D 5/0015; B01D 2253/102; B01D 2257/708; B01D 2257/80; B01D 2259/652; B01D 2259/4508; B01D 2258/06; E03B 3/28; F25B 21/02; F24F 2003/1444; F24F 2003/1446; F24F 2110/20; F24F 2130/00;
(Continued)

(56) References Cited

FOREIGN PATENT DOCUMENTS

| KR | 20050046881 A | * | 5/2005 | ............. A01G 27/04 |
| KR | 20150061788 A | * | 6/2015 | ............. B01D 53/26 |
| KR | 101656751 B1 | * | 9/2016 | ............ A01G 27/003 |

OTHER PUBLICATIONS

KR20050046881A_ENG (Espacenet machine translation of Son) (Year: 2005).*

(Continued)

*Primary Examiner* — Gabriel E Gitman
(74) *Attorney, Agent, or Firm* — Michael D. Eisenberg

(57) ABSTRACT

An air purifier apparatus, comprising: a housing comprising an air intake opening to an external environment outside the housing; a plant pot disposed downstream of the air intake, configured to hold soil, and being perforated so as to enable contact between at least some air outside the plant pot and at least some of the soil inside the plant pot; an air purification filter disposed downstream of the plant pot; a fan disposed downstream of the air purification filter; an air outlet disposed downstream of the fan and located in a first compartment of the housing; a dehumidifier disposed in a second compartment of the housing separate from the first compartment and configured to extract water from air interacting with the dehumidifier, the second compartment having an air exchange perforation opening to the external environment; a watering system, configured to circulate water located inside the housing to the plant pot.

15 Claims, 22 Drawing Sheets

(51) Int. Cl.
    *A01G 27/00*     (2006.01)
    *B01D 53/04*     (2006.01)
    *B01D 53/26*     (2006.01)
    *B01D 53/30*     (2006.01)
    *B01D 5/00*     (2006.01)
    *F24F 3/14*     (2006.01)
    *F24F 8/175*     (2021.01)

(52) U.S. Cl.
    CPC .... *B01D 2257/80* (2013.01); *B01D 2259/652* (2013.01); *F24F 8/175* (2021.01); *F24F 2003/1446* (2013.01)

(58) Field of Classification Search
    CPC .......... F24F 5/0042; F24F 8/108; F24F 11/64; F24F 8/175; A01G 27/00; A01G 27/005
    See application file for complete search history.

(56) References Cited

OTHER PUBLICATIONS

KR20150061788A_ENG (Espacenet machine translation of Park) (Year: 2015).*
KR101656751B1_ENG (Espacenet machine translation of Kang) (Year: 2016).*

* cited by examiner

AIR PURIFIER APPARATUS

CROSS-REFERENCES TO RELATED APPLICATIONS

This application claims priority from U.S. Provisional Application Ser. No. 62/915,225 filed Oct. 15, 2019, which is hereby incorporated herein by reference in the respective in its entirety.

TECHNICAL FIELD

The present invention is in the technical field of air purifiers and atmospheric water extraction devices.

BACKGROUND OF THE INVENTION

Conventional air purifiers use plastic disposable filters, over one hundred million disposable air filters and their packaging waste end up in landfills each year. Furthermore, conventional air purifiers don't address air pollution associated with humidity, as excess humidity amplifies both air pollution and allergens. In fact, mold and dust mites thrive in humid environments and are the cause for many allergic reactions.

BRIEF SUMMARY OF EMBODIMENTS OF THE INVENTION

There is therefore a need for an air purifying device that uses physical filtration via a physical filter and biochemical air purification via interaction of air with the soil of a plant, while extracting water from humid air to water the plant.

Therefore, an aspect of some embodiments of the present invention relates to an air purifier apparatus, comprising a housing, a plant pot, an air purification filter, a fan, an air outlet, a dehumidifier, and a watering system. The housing comprises an air intake opening to an external environment outside the housing. The plant pot is disposed downstream of the air intake, and is configured to hold soil and being perforated so as to enable contact between at least some air outside the plant pot and at least some of the soil inside the plant pot. The air purification filter is disposed downstream of the plant pot. The fan is disposed downstream of the air purification filter. The air outlet is disposed downstream of the fan and located in a first compartment of the housing. The dehumidifier is disposed in a second compartment of the housing that is separate from the first compartment, the dehumidifier being configured to extract water from air interacting with the dehumidifier, the second compartment having at least one air exchange perforation opening to the external environment outside the housing. The watering system is configured to circulate water located inside the housing to the plant pot. The fan is arranged to generate an air pressure gradient in the housing and draw air from the external environment through the air intake and downstream through the plant pot and/or around the plant pot, through the air purification filter, and out of the housing through the air outlet.

In a variant, the water located inside the housing comprises the water extracted by the dehumidifier.

In another variant, the housing comprises a front chamber, a middle chamber, and a rear chamber. The front chamber has a plurality of first perforations, the first perforations forming the inlet. The middle chamber is separated from the front chamber by a first wall, the first wall having a first opening, the fan being installed in the first opening. The rear chamber is separated from the middle chamber by a second wall, the rear chamber forming the second compartment. The dehumidifier is located in the rear chamber. A top of the middle chamber is at least partially uncovered, thereby forming the outlet. The fan is configured to drive the air from the external environment into the front chamber through the first perforations, then through the air purification filter, then through the fan into middle chamber, then out of the middle chamber via the top of the middle chamber, such that at least some of the air entering the housing via the first perforations is configured to interact with the soil and/or a root of the plant and to be filtered by interaction with the soil and/or by the root before passing through the air purification filter, and such that the air purification filter is configured to remove at least some particles from the air passing therethrough.

In yet another variant, the second wall comprises a second opening and the dehumidifier comprises a Peltier dehumidifier covering the second opening and comprising a warm plate and a cold plate. The warm plate faces the middle chamber. The cold plate faces and partially extending into the rear chamber, such that the air in the rear chamber contacts the cold plate, causing water vapor in the air to condense into the water thereby reducing a humidity of the air in the rear chamber, such that the water drips onto a water reservoir at a bottom of the rear chamber.

In a further variant, the air purifier apparatus comprises a heat sink joined to the hot plate and extending inside the middle chamber, such the air flows through the heat sink before being driven out of the housing and thereby cools the hot plate.

In a variant, the air purifier apparatus further comprises an air status sensor, configured to measure a humidity of the air either inside the housing or outside the housing, wherein the dehumidifier is configured to be activated when the measured humidity of the air is above a first threshold and deactivated when the measured humidity falls below a second threshold. The first threshold and the second threshold are equal to each other, or the first threshold is higher than the second threshold.

In another variant, the air purifier apparatus comprises a water reservoir below the dehumidifier, the water reservoir being configured to collect the water generated by the dehumidifier. The watering system comprises a water pump configured to pump water from the water reservoir into the plant pot to water the plant.

In yet another variant, the water reservoir is removably joined to the housing.

In a further variant, the air purifier apparatus comprises a soil moisture sensor configured to measure a soil moisture in the soil within the plant pot, wherein the watering system is configured to be activated to drive the water to the plant pot if the soil moisture falls below a first threshold and deactivated if the soil moisture rises above a second threshold. The first threshold and the second threshold are equal to each other, or the first threshold is lower than the second threshold.

In yet a further variant, the air purifier apparatus further comprising the soil and the plant, wherein the fan is configured to drive some air from the inlet through the soil and from the soil to the air purification filter.

In some embodiments of the present invention, the air purifier apparatus further comprises an air status sensor, a soil moisture sensor, a user interface, and a control unit. The air status sensor is configured to measure humidity of the air before the air reaches the dehumidifier and to generate first sensor data indicative of the humidity of the air. The soil moisture sensor is configured to measure a moisture level of the soil and to generate second sensor data indicative of the moisture of the soil. The user interface is configured for receiving one or more instructions from the user. The control unit is configured to: receive the first sensor data, the second sensor data, and the one or more instructions; process the first sensor data, the second sensor data, and the one or more instructions; control an operation of the dehumidifier according to first sensor data and the one or more instructions; and control an operation of the watering system according to the second sensor data and the one or more instructions.

In a variant, the one or more instructions comprise a selection of a type of plant contained in the plant pot from a plurality of predetermined plants. The control unit is configured to store watering data indicative of watering requirements of the predetermined plants and is configured to control the operation of the watering system according to the watering requirement of the selected plant and to the soil moisture.

In another variant, the watering data is indicative of a desired soil moisture and a desired speed for providing water to the soil.

In yet another variant, the air purifier apparatus comprises a water level sensor configured to measure a water quantity in the housing and to generate third sensor data indicative of the water quantity in the housing. The control unit is configured to calculate a desired water quantity in the housing based on the soil moisture level and the watering requirements of the plant. The control unit is configured to compare the desired water quantity to the water quantity in the housing provided by the water level sensor. If the water quantity in the housing is less than the desired water quantity, the control unit is configured to generate an alert signal and to transmit the alert signal to the user interface. Responsive to the alert signal, the user interface is configured to output a notification to the user to add water to the housing. If the water quantity is brought up to at least the desired level or if the soil moisture is increased to a desired soil moisture, the control unit is configured to stop generating the alert signal, and the user interface is configured to stop outputting the notification in response to a lack of the alert signal.

In a further variant, the one or more user instructions include a desired rotation speed of one or more blades of the fan. The control unit is configured to change a rotation speed of the one or more blades of the fan according to the one or more user instructions.

Another aspect of some embodiments of the present invention relates to an air purifier apparatus, comprising a housing, an air purification filter, a plant pot, a dehumidifier, an air outlet, a fan, and a watering system. The housing comprises an air intake. The air purification is filter disposed downstream of the air intake. The plant pot is disposed downstream of the air purification filter, is configured to hold soil and includes a mesh screen configured to enable contact between at least air outside the mesh screen and at least some of the soil inside the mesh screen. The dehumidifier is disposed downstream of the plant pot and configured to extract water from air interacting with the dehumidifier. The air outlet is disposed downstream of the dehumidifier. The fan disposed downstream of the plant pot and upstream of the dehumidifier arranged to generate an air pressure gradient in the housing and draw air through the air intake and downstream through the air purification filter, through the plant pot and/or around the plant pot, through the dehumidifier and out of the apparatus through the air outlet. The watering system is configured to circulate water located inside the housing to the plant pot.

In a variant, the water located inside the housing comprises the water extracted by the dehumidifier.

In a variant, the housing comprises a front chamber, a middle chamber, and a rear chamber. The front chamber has a plurality of first perforations, the first perforation forming the inlet. The middle chamber is separated from the front chamber by a first wall and has a first opening, the fan being installed in the first opening. The rear chamber is separated from the middle chamber by a second wall having at least portion having one or more second perforations. The dehumidifier is located in the rear chamber. The at top of the rear chamber is not covered, thereby forming the outlet. The fan is configured to drive the air from an outside of the housing into the front chamber through the first perforations, then through the filter, then through the fan into middle chamber, then into the rear chamber through the second perforations, then out of the rear chamber via the top of the rear chamber, such that the filter is configured to remove the at least some particles from the air passing therethrough and such that at least some of the air between the filter and the pot is configured to interact with the soil and/or a root of the plant to be filtered by interaction with the soil and/or by the root.

In another variant, the second wall comprises a second opening and the dehumidifier comprises a Peltier dehumidifier covering the second opening and comprising a warm plate a cold plate. The warm plate faces the middle chamber. The cold plate faces and partially extends into the rear chamber, such that the air in the rear chamber contacts the cold plate, causing water vapor in the air to condense into the water thereby reducing a humidity of the air in the rear chamber, such that the water drips onto a water reservoir at a bottom of the rear chamber.

In yet another variant, the apparatus comprises a heat sink joined to the hot plate and extending inside the middle chamber, such the air flows through the heat sink before being driven into the rear chamber and thereby cools the hot plate.

In a further variant, the apparatus further comprises an air status sensor, configured to measure a humidity of the air either inside the housing or outside the housing, wherein the dehumidifier is configured to be activated when the measured humidity of the air is above a first threshold and deactivated when the measured humidity falls below a second threshold. The first threshold and the second threshold may be equal to each other; or the first threshold may be higher than the second threshold.

In yet a further variant, the air purifier apparatus comprises a water reservoir below the dehumidifier, the water reservoir being configured to collect the water generated by the dehumidifier.

The watering system may comprise a water pump configured to pump water from the water reservoir into the plant pot to water the plant.

In some embodiments of the present invention, the air purification apparatus comprises a water reservoir located below the rear chamber and separated from rear chamber via a floor, the floor supporting the second wall and having a gap configured for being traversed by the water generated by the cold plate.

In a variant, the floor extends into the middle chamber and the water reservoir extends below the middle chamber.

In another variant, the water reservoir is removably joined to the housing.

In yet another variant, the air purifier apparatus comprises a soil moisture sensor configured to measure a soil moisture in the soil within the plant pot, wherein the watering system is configured to be activated to drive the water to the plant pot if the soil moisture falls below a first threshold and deactivated if the soil moisture rises above a second threshold. The first threshold and the second threshold may equal to each other; or the first threshold is lower than the second threshold.

In a further variant, the air purifier apparatus includes a user interface configured to receive from a user a selection of a plant located in the plant pot and for setting the first and second soil moisture thresholds according to the selection.

In some embodiments of the present invention, the filter comprises a support body and a filter bag. The support body is configured for being at least partially traversed by the air. The filter bag is joined to the support body, comprises a filter material being configured for retaining the at least some particles of the air traversing the filter bag, and is removable from the support body.

In a variant, the filter bag is replaceable.

In another variant, the filter bag is openable to replace the filter material contained therein.

In yet another variant, the air purifier apparatus further comprises a removable compact lid configured to cover a top of the front chamber and of the middle chamber, the compact lid not covering the rear chamber, the compact lid having a third opening having a perimeter joined to the plant pot when the compact lid is closed.

In a further variant, the air purifier apparatus further comprises the soil and the plant. The fan is configured to drive some air from the filter through the soil and from the soil into the middle chamber.

In some embodiments of the present invention, the air purifier apparatus further comprises: an air status sensor, configured to measure humidity of the air before the air reaches the dehumidifier and to generate first sensor data indicative of the humidity of the air; a soil moisture sensor, configured to measure a moisture level of the soil and to generate second sensor data indicative of the moisture of the soil; a user interface, configured for receiving one or more instructions from the user; and a control unit. The control unit is configured to: receive the first sensor data, the second sensor data, and the one or more instructions; process the first sensor data, the second sensor data, and the one or more instructions; control an operation of the dehumidifier according to the first sensor data and the one or more instructions; and control an operation of the watering system according to the second sensor data and the one or more instructions.

In a variant, the one or more instructions comprise a selection of a type of plant contained in the plant pot from a plurality of predetermined plants. The control unit is configured to store watering data indicative of watering requirements of the predetermined plants and is configured to control the operation of the watering system according to the watering requirement of the selected plant and to the soil moisture.

In another variant, the watering data is indicative of a desired soil moisture and a desired speed for providing water to the soil.

In yet another variant, the air purifier apparatus comprises a water level sensor configured to measure a water quantity in the housing and to generate third sensor data indicative of the water quantity in the housing. The control unit is configured to calculate a desired water quantity in the housing based on the soil moisture level and the watering requirements of the plant. The control unit is configured to compare the desired water quantity to the water quantity in the housing provided by the water level sensor. If the water quantity in the housing is less than the desired water quantity, the control unit is configured to generate an alert signal and to transmit the alert signal to the user interface. Responsive to the alert signal, the user interface is configured to output a notification to the user to add water to the housing. If the water quantity is brought up to at least the desired level or if the soil moisture is increased to a desired soil moisture, the control unit is configured to stop generating the alert signal, and the user interface is configured to stop outputting the notification in response to a lack of the alert signal.

In a further variant, the one or more user instructions include a desired rotation speed of one or more blades of the fan. The control unit is configured to change a rotation speed of the one or more blades of the fan according to the one or more user instructions.

Another aspect of some embodiments of the present invention, relates to the air purifier apparatus as described above, and the soil, which comprises activated charcoal, the soil being configured to be placed inside the plant pot.

Yet another aspect of some embodiments of the present invention relates to an air purifier apparatus, comprising: a housing comprising an air intake; an air purification filter disposed downstream of the air intake; a plant pot disposed downstream of the air purification filter, the plant pot being configured to hold soil and comprising a mesh screen configured to enable contact between at least air outside the mesh screen and at least some of the soil inside the mesh screen; a humidifier disposed downstream of the plant pot and configured to humidify air interacting with the humidifier; an air outlet disposed downstream of the humidifier; a fan disposed downstream of the plant pot and upstream of the humidifier and arranged to generate an air pressure gradient in the housing and draw air through the air intake and downstream through the air purification filter, through the plant pot and/or around the plant pot, through the humidifier and out through the air outlet outside of the apparatus.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
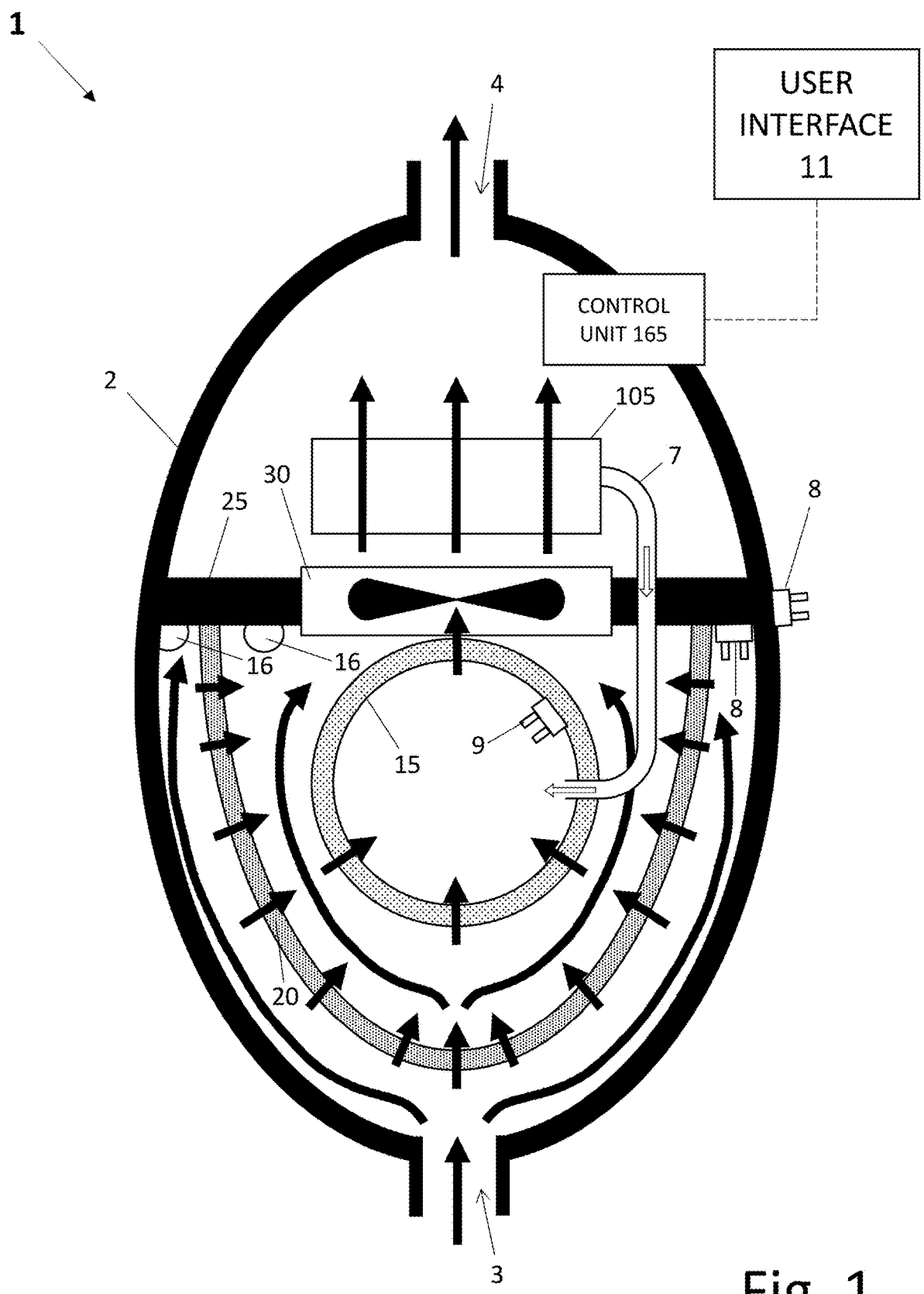
FIG. 1 is a plan view of an air purifier with a condenser, according some embodiments of the present invention.

FIG. 1 is a plan view of an air purifier 1 with a condenser 105, according some embodiments of the present invention.

The air purifier 1 includes a housing 2 having an air intake 3 and an air outlet 4, an air purification filter 20 located downstream of the intake, a plant pot 15 disposed downstream of to the purification filter, a dehumidifier 105 disposed downstream of the plant pot. The air outlet 4 is disposed downstream of the dehumidifier 105. The air purifier 1 also includes a fan 30 and a watering system 7. The fan 30 is disposed downstream of the plant pot 15 and upstream of the dehumidifier 105, and is arranged to generate an air pressure gradient in the housing 2 and to draw air through the air intake 3 and downstream through the air purification filter 20, through the plant pot 15 and/or around the plant pot 15, through the dehumidifier 105 and out through the air outlet 4 outside of the housing 2. The watering system 7 is configured to circulate water generated by the dehumidifier 105 from inside the housing 2 to the plant pot 15.

Air flow is represented by the black-filled arrows. Air is driven by the fan into the housing 2 via the air intake 3. The air then passes through the air purification filter 20, which uses adsorption to prevent passage of at least some of the particles and/or vapors (such as Volatile Organic Compounds) in the air. This is physical filtering of the air. For example, the air purification filter is configured to absorb and/or trap at least some particles and/or vapors in the air. The air purification filter 20 may, for example include activated charcoal and hemp.

After passing through the air purification filter 20, air is driven around the plant pot 15. The plant pot 15 is perforated so some of the soil (and in some embodiments of the present invention, a portion of the roots of the plan) is exposed to the air flowing in the vicinity of the plant pot 15. The plant put may includes a wire mesh or a plastic mesh, for example. By interacting with the soil and possibly the roots, the air that has passed through the air purification filters 20 is further filtered via biochemical filtration. In biochemical filtration, the microorganisms living in the plant's roots and soil help break down pollutants into safer compounds, as delineated in a report publicly available in the NASA archives called "INTERIOR LANDSCAPE PLANTS FOR INDOOR AIR POLLUTION ABATEMENT" written by B. C. Wolverton, Anne Johnson, and Keith Bounds on Sep. 5, 1989, document ID 19930073077, accession number N93-70524, report number NASA-TM-101766, NAS 1.15:101766. In some examples of the present invention, the plant may include English Ivy, Golden Pothos, Peace Lilly, Chinese Evergreen, Bamboo Palm, and Janet Craig. These plants are known to break down pollutants like formaldehyde, trichloroethylene, and benzene, for example. Other plants that are know to break down some pollutants may includes *ficus elastic, chlorophytum amaniense, chlorophyttum comosum, anthurium andraenum, chrysalidocarpus lutescens, nephrolepis exaltata, jasminum, spathuphyllum, aglaonema.*

In some embodiments of the present invention, the fan 30 is powerful enough to drive at least some air into the plant pot 15 and out of the plant pot 15, when the plant pot 15 is filled with soil and contains a plant. This increases contact between the air with the soil and the plant's roots and therefore enhances biochemical filtration. In some embodiments of the present invention, the rotation speed of the blades of the fan 30 is adjustable according to the need for pollution removal and/or dehumidification. For example, the rotation speed may be selectable among a predetermined number of speeds, such as three, four, five, or more. The faster the rotation of the blades of the fan 30, the more air goes through the air purifier.

In some embodiments of the present invention, the fan is powerful enough to drive air from above the soil in the plant pot 15 into the plant pot 15 and out of the bottom of the plant pot 15. In these embodiments, a kit is provided, including the air purifier 1 and the soil to be placed in the plant pot. The soil may contain activated charcoal. Thus, activated charcoal in the soil provides physical filtering while the soil (along with the plant roots within) provides biochemical filtering. In some embodiments of the present invention, the kit includes one or more seeds of the plant. The seeds are configured to be placed in the soil and grow into the plant.

After the air has undergone physical and biochemical filtration, the air is driven by the fan 30 to a dehumidifier 105, which is configured to extract water from the air interacting with the dehumidifier 105. In some embodiments of the present invention, the dehumidifier 105 causes water vapor in the air to condense. In this manner, the air purifying apparatus 1 is designed to dehumidify at least some of the air passing therethrough. Thus, survival of pollutants like dust mites and mold is decreased. Air pollutants and mold tend to cling on moisture particles in the air. Therefore, regulating excess humidity, kills mold and dust mites that strive in humid conditions.

In some embodiments of the present invention, the dehumidifier 105 is an active dehumidifier (i.e., needs to be activated to operate) and is activated when air humidity is higher than a certain threshold. For example, the air purifier apparatus 1 may include at least one air status sensor 8 disposed upstream of the dehumidifier 105 and which may be located in the housing 2 or outside the housing 2. The air status sensor 8 is configured to measure a humidity of the air either inside the housing or outside the housing (depending on the location of the air status sensor 8), to activate the dehumidifier 105 when the measured humidity of the air is above a first threshold, and to deactivate the dehumidifier 105 when the when the measured humidity falls below a second threshold. In some embodiments of the present invention, the first threshold and the second threshold are equal to each other. In some embodiments of the present invention, the first threshold is higher than the second threshold. Therefore, the dehumidification only occurs when the humidity level in the air is higher than desired.

In some embodiments of the present invention, the air purification apparatus 1 includes a control unit 165 and is associated with or includes a user interface 11 communicating by wire or wirelessly with the control unit 165. The control unit 165 controls the operation of the different elements of the air purifier. Via the user interface, the user can enter an instruction and/or input a selection that are processed by the control unit 165 and cause the control unit 165 to control the different elements of the air purifier accordingly. The user interface 11 may include a keypad or touch screen joined to the outside of the housing 2, a remote control in wireless communication with the control unit 165, or a smartphone/tablet/computer running machine readable instructions (an application) configured to receive instructions from the user (as described above) and to communicate the user instructions to the control unit 165.

Air has now gone through physical filtering by the air purification filter 20, biochemical filtering by interaction with the soil and/or roots in the plant pot 15, and (depending on the humidity of the air) a dehumidification process. The filtered and (if desired) dehumidified air is driven out of the housing 2 by the fan 30 via the air outlet 4 and back into the external environment from which air was taken.

In some embodiments of the present invention, a wall 25 separates a proximal portion of the housing 2 in which the air purification filter 20 and the plant pot 15 are located from a distal portion of the housing 2 in which the dehumidifier 105 is located. The fan 30 is installed in an opening of the wall 25 and drives air from the proximal portion of the housing 2 to the distal portion of the housing 2 via the opening in the wall 25.

Figure 11:
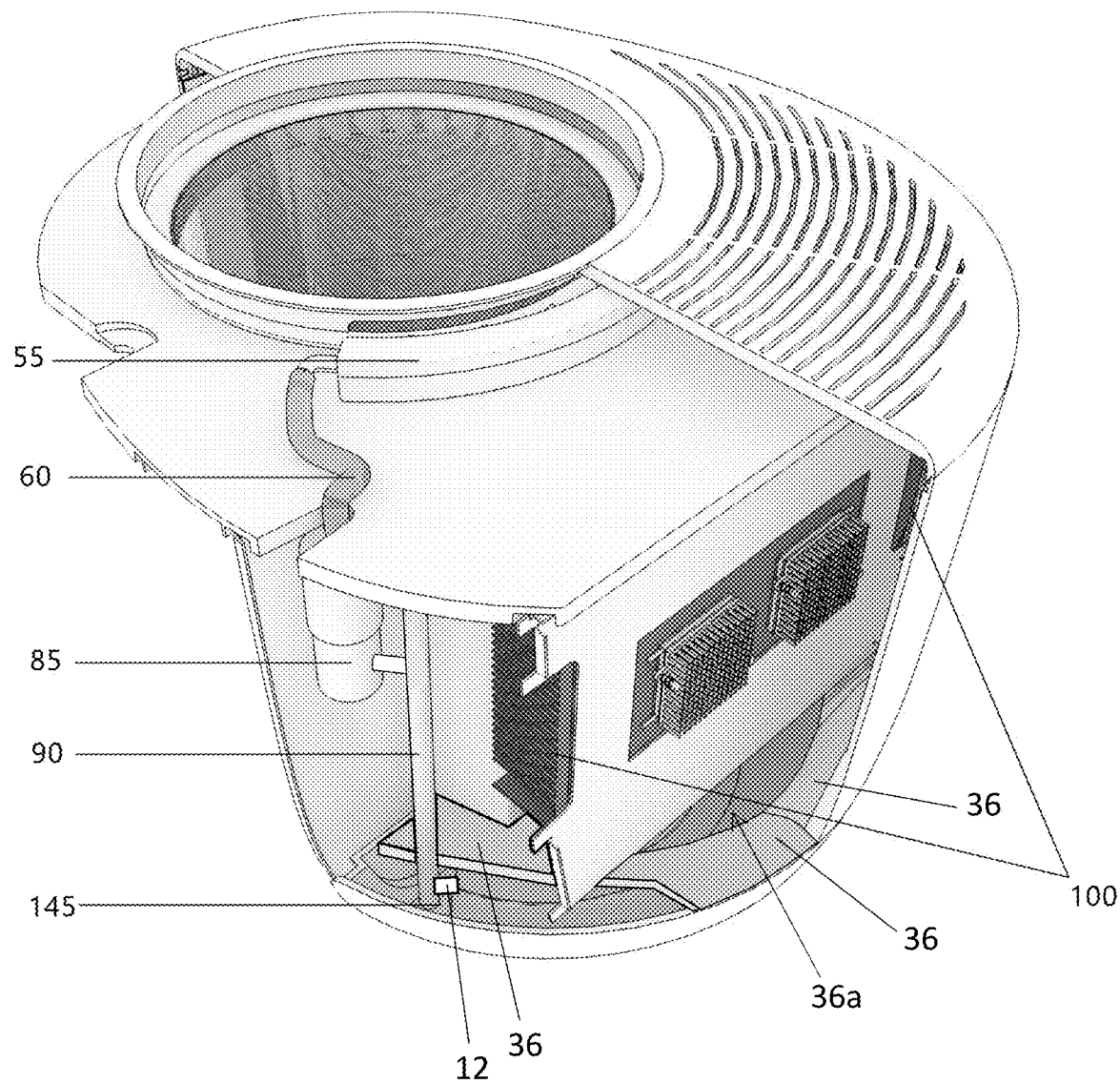
FIG. 11 is a cutout of the air purifier of FIG. 2 showing the watering system from the side, according to some embodiments of the present invention.

Water extracted by the dehumidifier 105 is collected and circulated by a water circulation system 7 into the plant pot 15 in order to water the soil contained in the plant pot 15. In this manner, the plant in the plant pot 15 is kept watered by water extracted from air, and the user is not required to water the plant as long as enough water is extracted by dehumidifier 105. In some embodiments of the present invention, if not enough water is extracted by the dehumidifier (for example when the air is dry), a water reservoir 35 (described further below) contains a low amount of water. The water level is measured by a water level sensor 12 (as seen in FIG. 11), which is designed to measure the water level in the water reservoir. If the water level in the reservoir is below a desired water level (calculated by the control unit 165 by processing the current soil moisture level and the watering requirement of the selected plant), the control unit 165 (which receives sensor data from the water level sensor 12) generates and sends an alert signal to the user interface. Responding to the alert signal, the user interface 11 is configured to output a notification to the user to directly water the plant or to add water to a water reservoir 35 (described further below) accessible to the watering system 7, in order to enable the watering system 7 to provide to the plant water according to the requirements of the plant. If the user adds water to the water reservoir to match or exceed the desired water level or if a desired moisture of the soil is achieved by the user directly watering the plant, the control unit stops the generation of the alert signal. In response to the lack of the alert signal, the user interface 11 stops outputting the notification.

In some embodiments of the present invention, the air purifier apparatus 1 incudes at least one soil moisture sensor 9 configured to measure a soil moisture level in the soil within the plant pot. The water circulation system 7 is activated to circulate water into the plant pot 15, if the soil moisture level falls below a first soil moisture level threshold, and is deactivated if the soil moisture level rises above a second soil moisture level threshold.

The first soil moisture level threshold and the second soil moisture level threshold may be are equal to each other. Alternatively, the first soil moisture level threshold is lower than the second soil moisture level threshold. If should be noted that the first and second moisture level thresholds depends on the plant that is in the plant pot 15, as different plants require the soil to be at different moisture levels. In some embodiments of the present invention, the timing and speed at which water is provided by the watering system 7 to the plant when the soil moisture level falls below the first soil moisture level depend on the type of plant in the plant pot 15. Some plants require that water be provided to the soil immediately when the soil moisture level falls below the first soil moisture level threshold. Other plants may require that water be provided after a certain time interval. Different plants absorb water at different rates. Therefore, the speed at which the watering system 7 provides water to the soil changes according to the plant in the plant pot (as selected by the user via the user interface).

In some embodiments of the present invention, the air purifier 1 includes one or more UV light emitters 16 configured for illuminating the air in the air purifier 1. UV light is known to kill certain microbes. The UV light emitters may be, for example, in the space between the inlet 3 and the air purification filter 20, or in the space between the air purification filter 20 and the fan 30.

Figure 2:
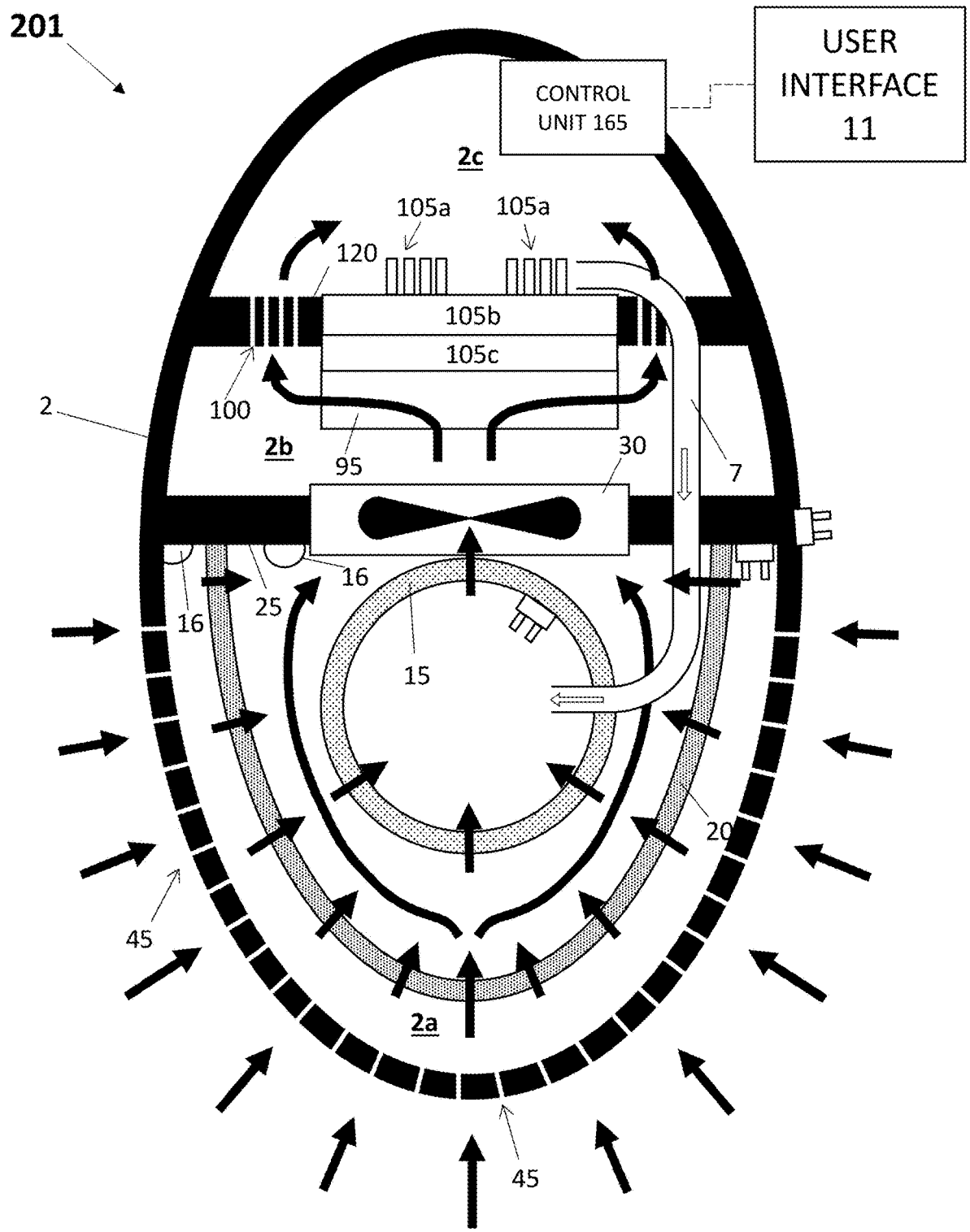
FIG. 2 is a plan view of an air purifier with a housing divided into three chambers, according some embodiments of the present invention.

FIG. 2 is a plan view of an air purifier 201 with a housing divided into three chambers, according some embodiments of the present invention.

Figure 3:
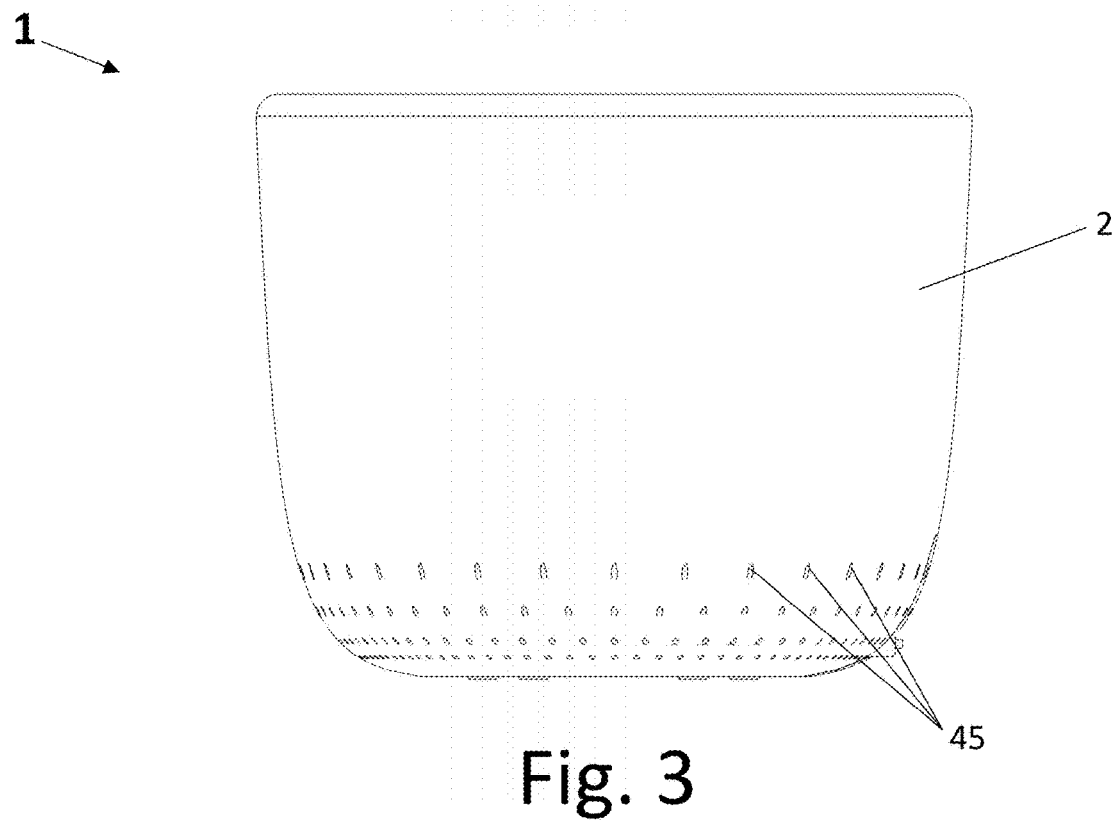
FIG. 3 is a front view of the air purifier of FIG. 1 or FIG. 2, according to some embodiments of the present invention.
Figure 4:
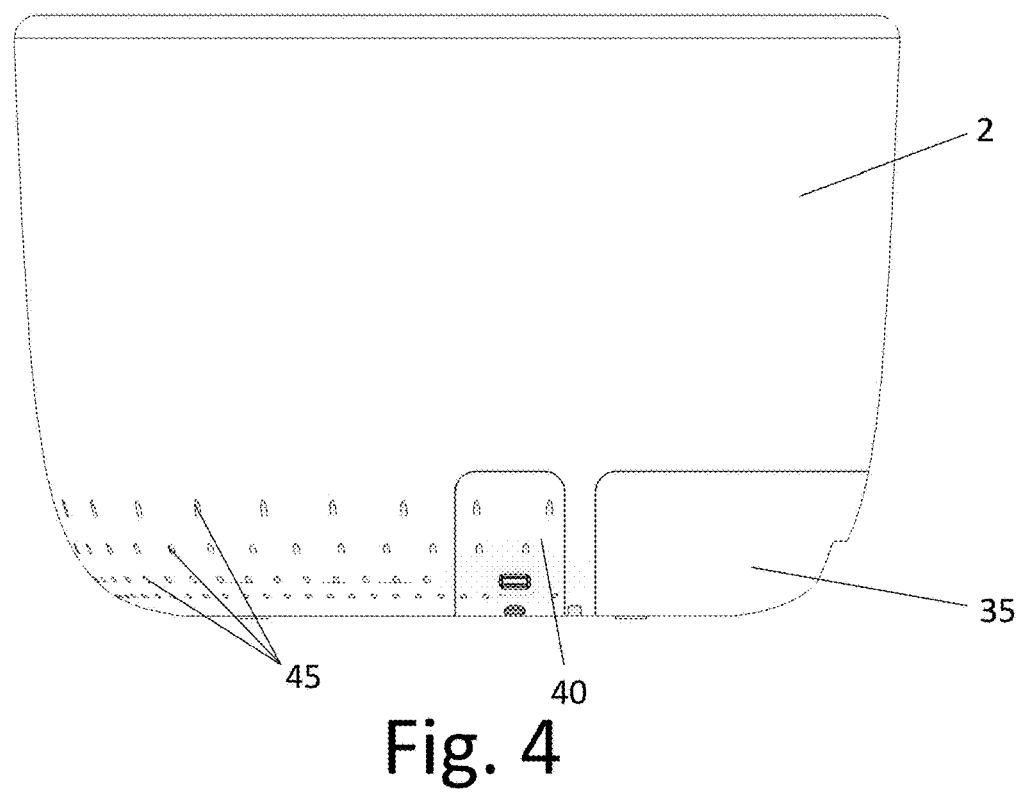
FIG. 4 is a side view of the air purifier of FIG. 1 or FIG. 2, according to some embodiments of the present invention.
Figure 5:
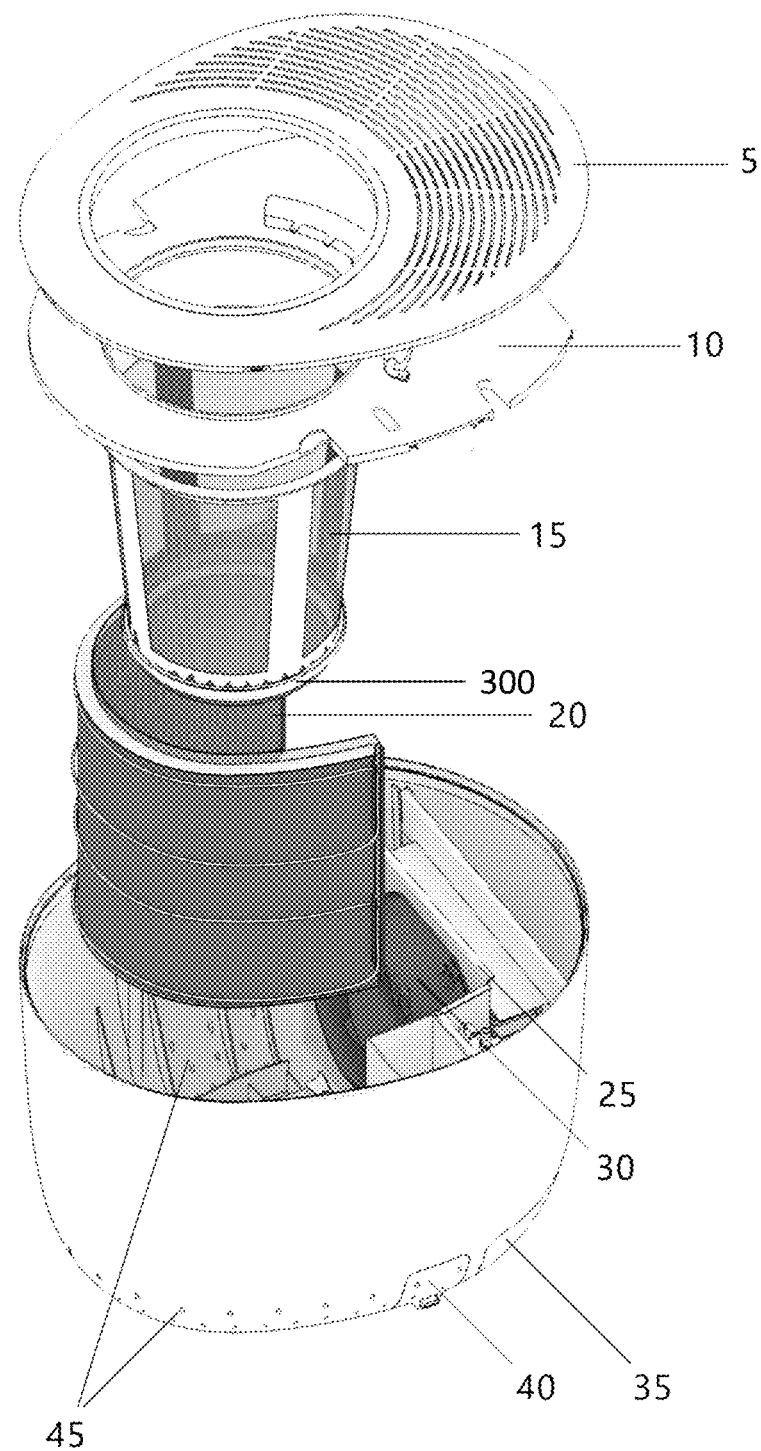
FIG. 5 is an exploded view of the air purifier of FIGS. 2, according to some embodiments of the present invention.
Figure 7:
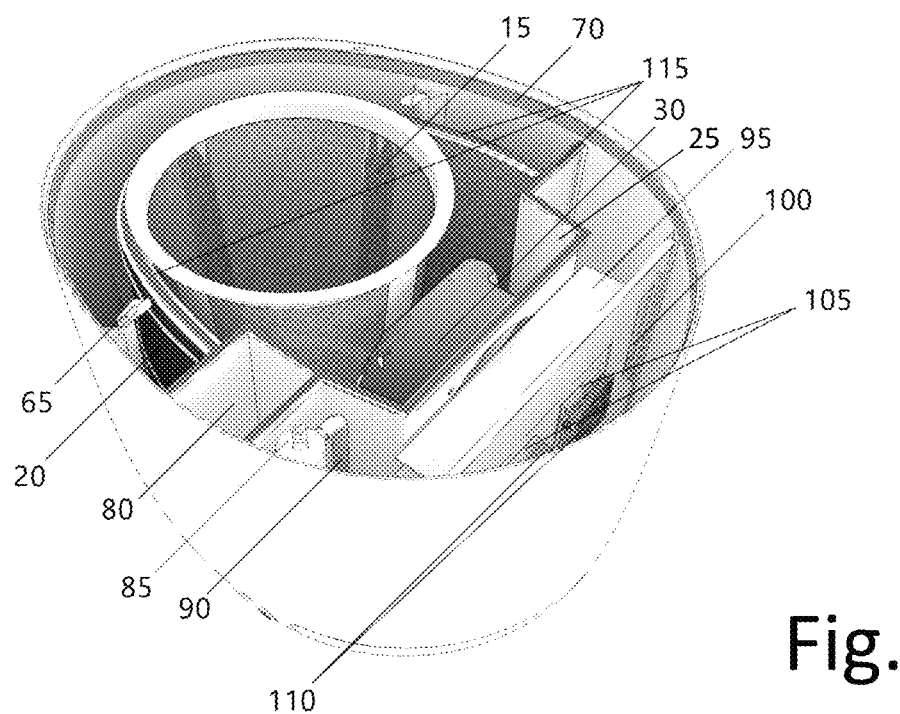
FIG. 7 is a view of the air purifier of FIG. 2 without the perforated lid and the compact lid, according to some embodiments of the present invention.
Figure 8:
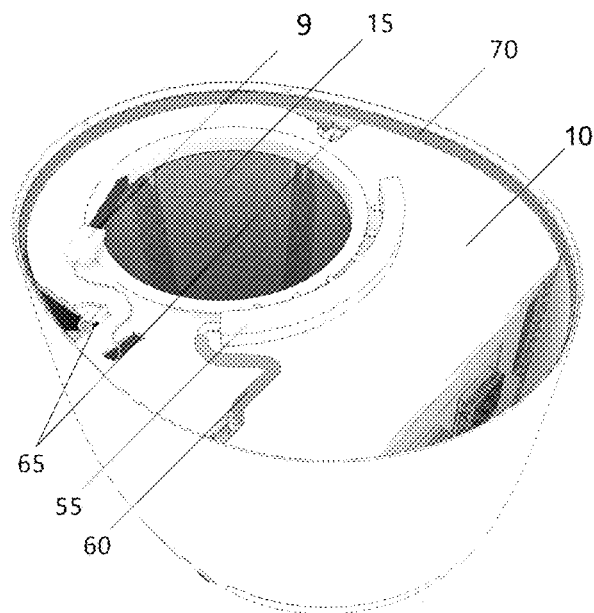
FIG. 8 is a view of the air purifier of the air purifier of FIG. 2 without the perforated lid, according to some embodiments of the present invention.
Figure 9:
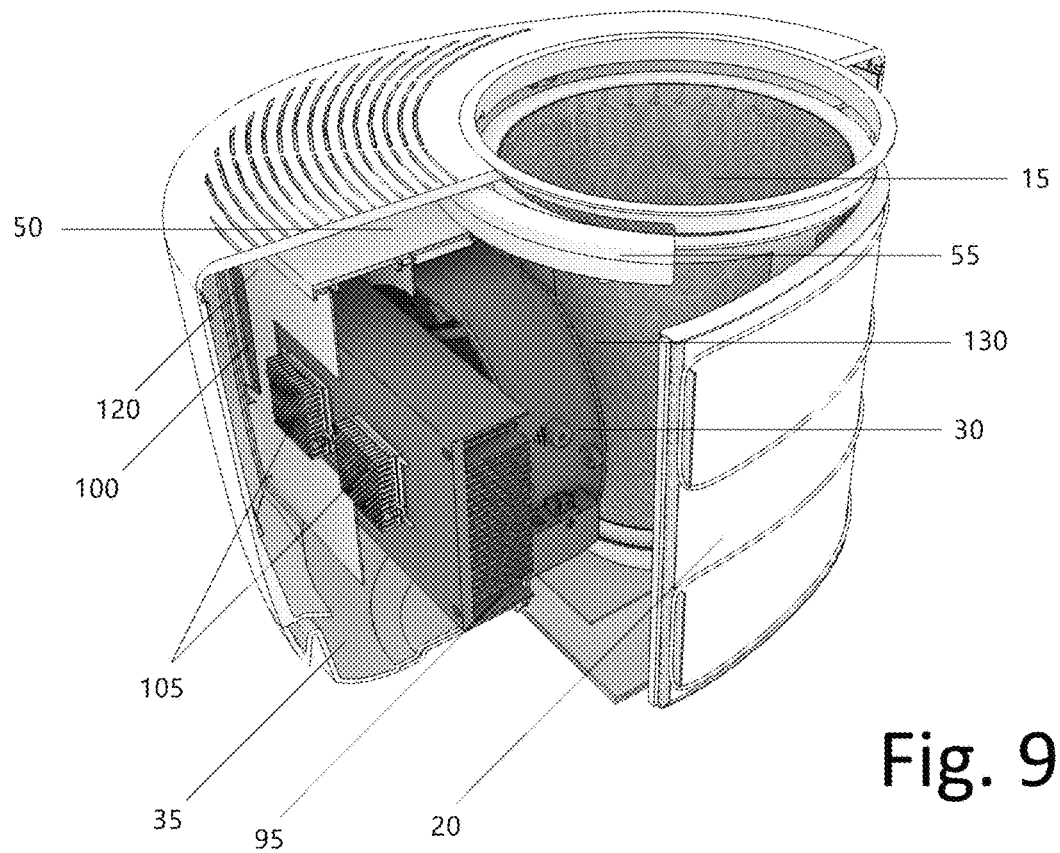
FIG. 9 is a cutout of the air purifier of FIG. 2 showing the front of the air purifier, according to some embodiments of the present invention.
Figure 10:
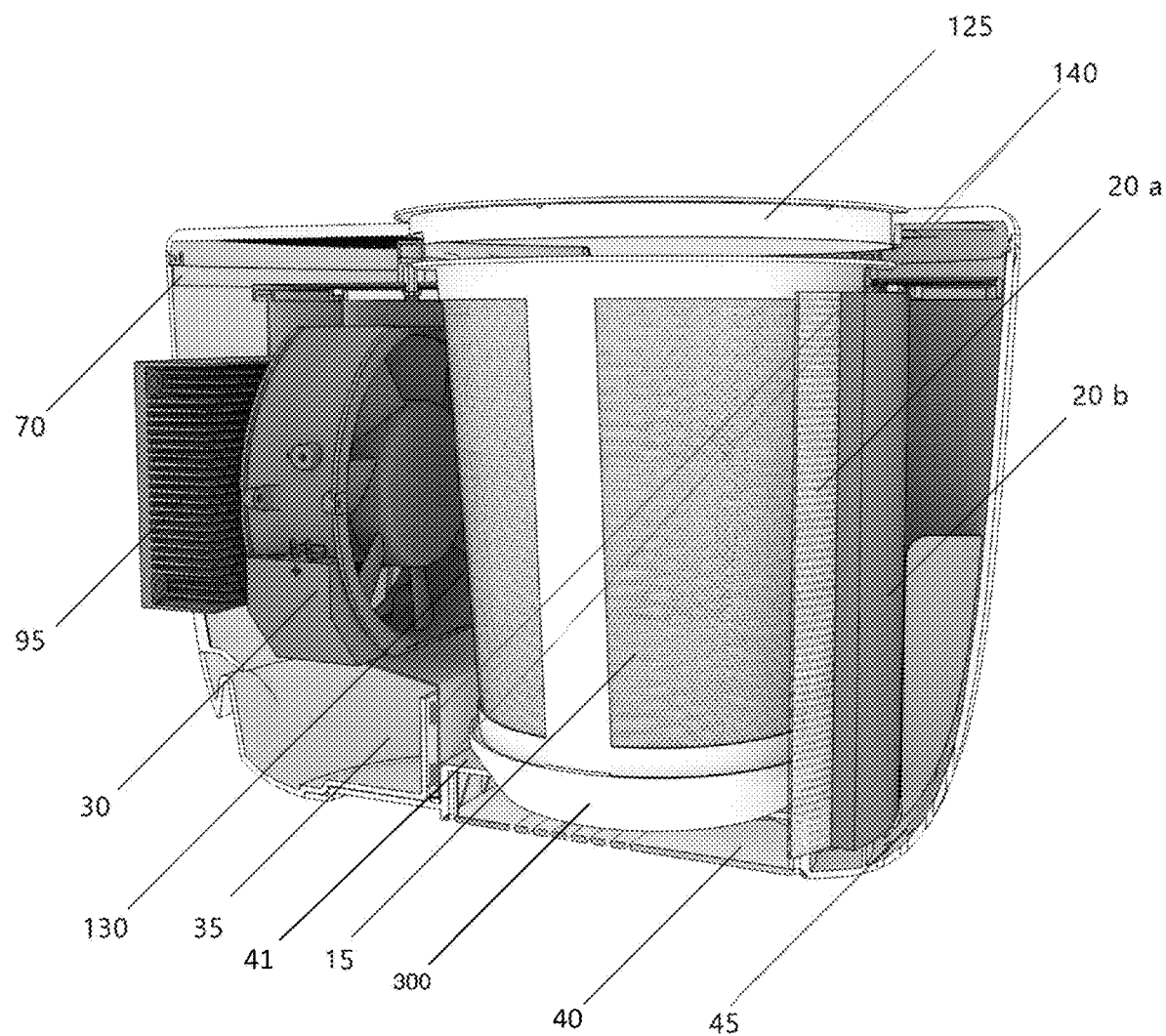
FIG. 10 is a cutout of the air purifier of FIG. 2 showing the side of the air purifier, according to some embodiments of the present invention.
Figure 12:
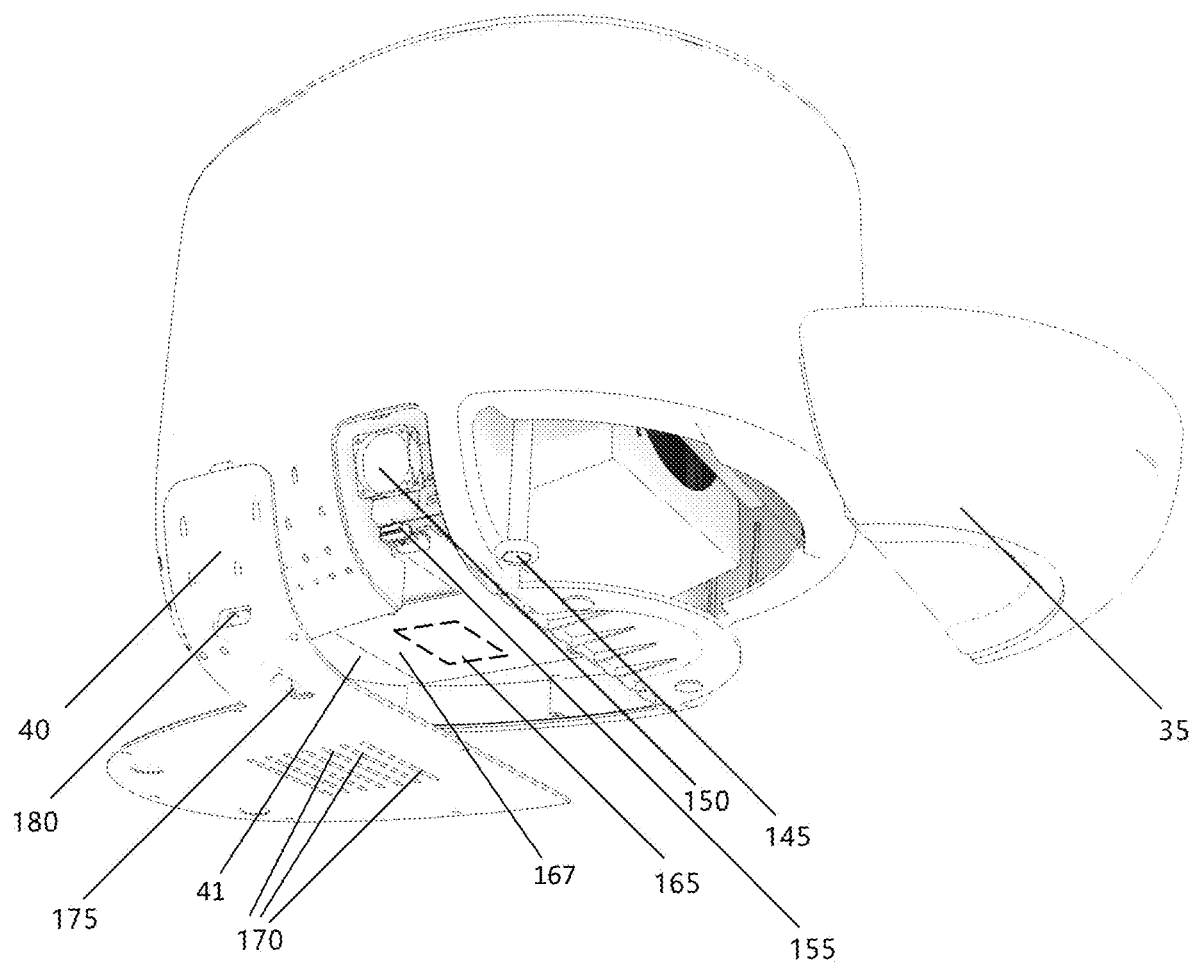
FIG. 12 is a perspective view of the air purifier of FIG. 2 with the water tank and an electronics panel removed, according to some embodiments of the present invention.

FIG. 3 is a front view of the air purifier of FIG. 1 or FIG. 2, according to some embodiments of the present invention. FIG. 4 is a side view of the air purifier of FIG. 1 or FIG. 2, according to some embodiments of the present invention. FIG. 5 is an exploded view of the air purifier 201 of FIG. 2, according to some embodiments of the present invention. FIG. 7 is a view of the air purifier 201 of FIG. 2 without the perforated lid and the compact lid, according to some embodiments of the present invention. FIG. 8 is a view of the air purifier of the air purifier 201 of FIG. 2 without the perforated lid, according to some embodiments of the present invention. FIG. 9 is a cutout of the air purifier 201 of FIG. 2 showing the front of the air purifier, according to some embodiments of the present invention. FIG. 10 is a cutout of the air purifier of FIG. 2 showing the side of the air purifier, according to some embodiments of the present invention. FIG. 11 is a cutout of the air purifier of FIG. 2 showing the watering system from the side, according to some embodiments of the present invention. FIG. 12 is a perspective view of the air purifier of FIG. 2 with the water tank and an electronics panel removed, according to some embodiments of the present invention.

The air purifier apparatus 201 of FIG. 2 has the same features as the air purifier apparatus 1 of FIG. 1. In addition, the air purifier apparatus 201 of FIG. 2 has features that are more detailed variants of the features described in the air purifier apparatus 1 of FIG. 1.

In the air purifier apparatus 201, the housing 2 is divided into a front chamber 2a, a middle chamber 2b, and a rear chamber 2c. In the front chamber 2a, the air inlet is in the form of a plurality of first perforations 45, which open to the external environment and through which air is driven by the fan 30 into the housing 2. The first perforations 45 may be located near a bottom region of the housing 2 (as shown in FIGS. 3, 4, and 5). The first wall 25 denotes the end of the front chamber 2a and has a first opening in which the fan 30 is installed. The first chamber 2a contains the air purification filter 20 and the plant pot 15.

A second wall 120 is located downstream of the first wall 25. The region between the first wall 25 and the second wall 120 is the middle chamber 2b. The remaining region downstream of the second wall 120 is the rear chamber 2c. In use, a compact lid 10 (see FIGS. 5 and 8) covers the first chamber 2a (with the exception of the plant pot 15, which is, however, filled by soil) and the second chamber 2b. The rear chamber 2c is not covered by the compact lid 10, and functions as the air outlet, as air is driven by the fan 30 out of the open top of rear chamber 2c into the external environment.

In some embodiments of the present invention, the second wall 120 has a second opening that is covered by the dehumidifier 105. The dehumidifier 105 may include a Peltier condenser, which has a cold plate 105a, a power element 105b, and a warm plate 105c. When activated, the power element 105b transfers heats from the cold plate 105a to the warm plate 105c, thereby warming the warm plate 105c and cooling the cold plate 105a. The cold plate 105a is in the rear chamber 2c. The warm plate 105c is located in the middle chamber 2b. Air is driven from the middle chamber 2b into the rear chamber 2c via second perforation 100 in the second wall 120. Some of the air in the rear chamber 2c interacts with the cold plate 105a, causing water vapor in the air to condense. Thus, humidity is removed from at least some of the air in the rear chamber 2c before the air is reintroduced into the external environment.

In some embodiments of the present invention, some of the air flowing in the middle chamber 2b interacts with the warm plate 105c and absorbs some heat of the warm plate 105c and cools down the warm plate 105c. In some embodiments of the present invention, the air purifier 201 includes a heat sink 95 which is joined to the warm plate 105c and is configured for enhancing cooling of the warm plate 105c by air flowing through the heat sink 95. The heat sink 95 extends inside the middle chamber 2b. The heat sink 95 may include a plurality of the heat conductive plates or fins. The air flows between the plates on the way to exiting the middle chamber 2b and absorbs heat from the plates and therefore from the warm plate 105c. In some embodiments, the heat conductive plates are substantially horizontal and the second perforations 100 are located at the sides of the heat sink 95, as seen, for example, in FIGS. 2 and 11. Therefore air entering the middle chamber 2b is driven into the heat sink 95 and guided by the heat conductive plates to the sides of the second wall 120 where the second perforations 100 are located.

In some embodiments of the present invention, the housing 2 includes an electronics chamber 80 which is separate from the rest of the housing 2, as seen in FIG. 7. The electronics chamber contains the power supply, the wires from the power supply to the different powered elements of the air purifier 1 or 201, and the communication wires that enable passage of signals between the control unit 165 and the different elements that supply data to the control unit or receive instructions from the control unit 165.

In some embodiments of the present invention, a perforated cap 5 is located above the compact lid 10. The perforated cap covers the rear chamber 2c as well. However, perforations in the perforated cap enable air from the rear chamber 2c to exit the rear chamber into the external environment. The perforated cap 10 is configured to cover the housing and prevent users from accessing the rear chamber 2c and touching the dehumidifier when in use.

In some embodiments of the present invention, the watering system 7 includes a water reservoir 35 located below the dehumidifier (or below the dehumidifier's cold plate 105a). As shown in FIGS. 10 and 11, the water reservoir 35 may be below the rear chamber 2c and separated from the rear chamber 2c by a floor 36. The floor 36 has a gap 36a under the dehumidifier (or below the dehumidifier's cold plate 105a), configured to be traversed by the water generated by the dehumidifier. In some embodiments of the present invention, the floor extends into the middle chamber 2b and the water reservoir extends below the middle chamber 2b as well. As shown in FIG. 12, the water reservoir 35 may be removably joined to the housing 2.

The watering system also includes an input pipe 90, a water pump 85, and an output tube 60. The input pipe 90 has an inlet 145 inside the water reserve 35 and is connected to the water pump 85, so that when the water pump is in operation water from the reservoir 35 is drawn into the input pipe 90 via the inlet 145 and brought into the water pump 85. The output tube 60 is connected to the water pump 85 and configured to receive water from the water pump 85. The water is driven though the output tube 60 by the water pump 85 and into a region 55 in the vicinity of the plant pot 15. In the region 55, the tube 60 has one or more outlets configured to direct water flowing in the tube 60 into the plant pot, to water the soil and the plant located therein.

In some embodiments of the present invention, as shown in FIG. 7, for example, a sealing strip 115 is placed on top of the purification filter 20 and the first wall 25. When the compact lid 10 is placed on the first wall and the purification filter, the sealing strip prevents entry of air into the region between the purification filter 20 and the first wall 25 from the top. In this manner, while the air purifier 201 is in operation, air entering the region 130 between the purification filter 20 and the first wall 25 either goes through the soil or via the purification filter 20.

In some embodiments of the present invention, the housing 2 includes one or more pressure clips that cooperate with the compact lid 10 and tighten the compact lid 10 onto the first wall and the purification filter, so that the joining between the lid 10 and the housing is air tight, and air flows as desired.

According to some embodiments of the present invention, the air purifier 1 includes a light strip 70. In some embodiments of the present invention, the light strip 70 provides decorative illumination via light in one or more colors. In some embodiments of the present invention, the user chooses a preferred color of the light via the user interface 11. The user's choice is transmitted by the user interface to the control unit 165, which causes the light strip to display the color chosen by the user. In some embodiments of the present invention, the light strip 70 includes one or more light emitting diodes (LEDs).

In some embodiments of the present invention, the air status sensor 8 also measures parameters of the air that are indicative of the air quality, such as the presence and concentration of pollutants, for example. The measurements by the air status sensor 8 are processed by a control unit 165 (shown in dashes in FIG. 12, the control unit 165 is on the side of the panel 167 that is not seen in FIG. 12). In some embodiments of the present invention, the control unit 165 is on the panel 167 located under the floor 41, which supports the plant pot 15 and the drainage vat 300. The control unit 165 is configured for generating an output signal indicative of the quality of the air. The light strip 70 is configured to receive the output signal and to change color according the signal. Each light color is associated with an air quality status. For example, red light means the air quality is low (e.g., air is polluted), while green light means air is quality is high (e.g., low pollution).

In some embodiments a second fan 150 is included to cool down the control unit 165. In some embodiments of the present invention, a USB port 155 is connected to the control unit 165 to transfer data to and from the control unit 165. In some embodiments of the present invention, the USB port is configured for powering an external element, such as a grow light lamp, which produces light for the plant and allows the plant to grow in dark environments. The control unit 165, the second fan 150 and the USB port 155 may be covered by a removable panel 40. The panel 40 may have apertures 170, to enable entry of air into panel 40 to cool down the control unit. The panel 40 may also have a second aperture 180 aligned with the USB port and configured to allow access to the USB port without removing the panel 40. The removable panel may also include an opening 175 configured to be traversed by a power cord (not shown) that supplies electrical power to the air purifier 201.

In some embodiments of the present invention, the control unit 165 controls the operation of different elements in the air purifier, such as the dehumidifier 105, the fan 30, the watering system 7. The control unit 165 also receives data from the different sensors, such as the soil moisture sensor 9, the air status sensor 8, the water level sensor 12 and operates the fan 30, the dehumidifier 105, and the watering system accordingly. The control unit 165 is in communication with the user interface 11 and receives therefrom user inputs and/or user instructions as explained above, and processes the user inputs to operate the air purifier according to predetermined modes of operations or processes the user inputs to override the predetermined modes of operations and operate the air purifier according to the user instructions. In some embodiments of the present invention, the control unit 165 is configured to send to the user interface 11 data indicative of at least some sensor data in order to display the sensor data to the user on the user interface.

In some embodiments of the present invention, the air purifier 201 includes a drainage vat 300 located under the plant pot 15 (optionally joined to the bottom of the plant pot 15). The drainage vat is configured to receive excess water that is not absorbed by the soil. The drainage vat is optionally supported by a floor 41. In some embodiments of the present invention, the plant pot 15 is removable from the housing for cleaning and removing the drained water, as seen in FIG. 5.

In some embodiments of the present invention, the air purifier 201 includes one or more ultraviolet (UV) light emitters 16 configured for illuminating the air in the air purifier 201. UV light is known to kill certain microbes. The UV light emitters may be, for example, in the front chamber 2a, in the space between the perforations 45 and the air purification filter 20, or in the space between the air purification filter 20 and the first wall 25.

Figure 6:
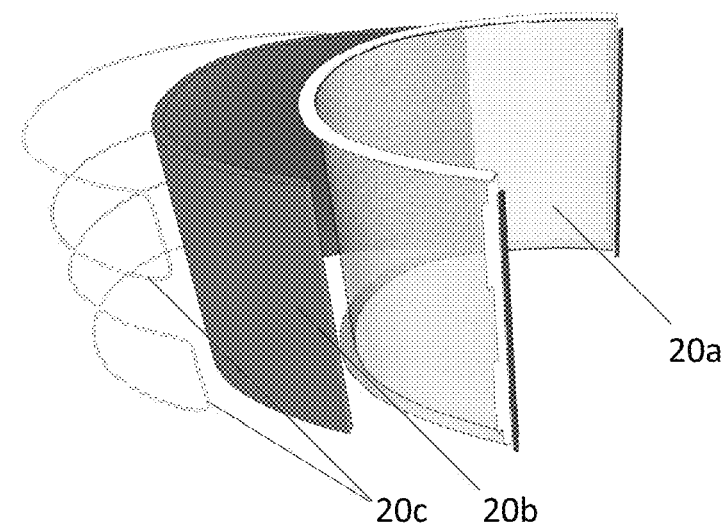
FIG. 6 is an exploded view of the filter of the air purifier of FIG. 1 or FIG. 2, according to some embodiments of the present invention.

FIG. 6 is an exploded view of the filter 20 of the air purifier of FIG. 1 or FIG. 2, according to some embodiments of the present invention.

In some embodiments of the present of the present invention the purification filter 20 includes a mesh configured for enabling passage of air therethrough, while trapping pollutants. The mesh may be removably joined to the housing, so the purification filter can be cleaned of pollutants. In some embodiments of the present invention, the purification filter 20 includes the filter body 20*a*, an air filter bag 20*b*, and a retaining element 20*c*. The filter body 20*a* is a frame configured for receiving the air filter bag 20*b*. The retaining element 20*c* is configured to maintain the air filter bag 20*b* joined to the filter body 20*a*. The air filter bag 20*b* is the element that retains pollutants in the air via absorption.

In some embodiments of the present invention, the air filter bag 20*b* is reusable and refillable. The filter bag contains a filtering material. The filtering material may be any known filtering material, and may include activated charcoal (for example, but not limited to activated bamboo charcoal), hemp, or any material used in filters in order to trap pollutants. Once the filtering material is filled with pollutants and no longer allows passage of air therethrough, the filter bag can be removed from the filtering body, the filtering material can be disposed of, and the filtering bag can be refilled with new filtering material and joined to the filtering body. In some embodiments of the present invention the filtering material is biodegradable.

In some embodiments of the present invention, the air filter bag may be removable, disposable, and replaceable as a whole, as explained above. In some embodiments of the present invention the air filter bag 20*b* may be entirely biodegradable and include hemp and activated charcoal.

Figure 13:
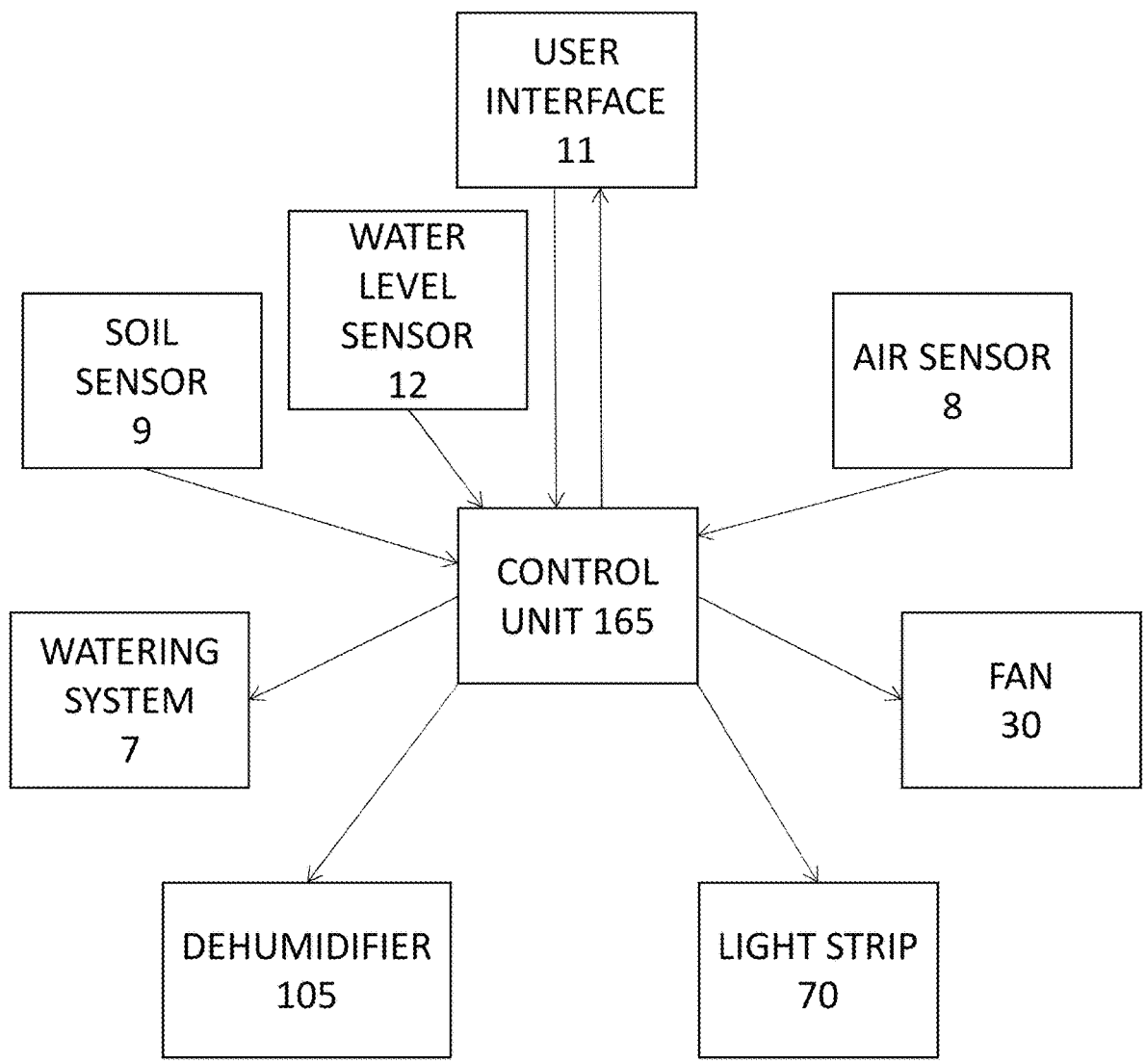
FIG. 13 is a block diagram illustrating the communication between a control unit and the various element of the air purifier, according to some embodiments of the present invention.

FIG. 13 is a block diagram illustrating the communication between the control unit 165 and the various element of the air purifier 1 or 201 described above, according to some embodiments of the present invention.

The control unit 165 receives sensor data from the soil sensor 9, the water level sensor 12 (if present), and air sensor 8. The control unit 165 also receives a user input from the user via the user interface 11. The control unit 165 processes the user input and the sensor data and operates the fan 30, the dehumidifier 105, the watering system 7, and the light strip 70 (if present) accordingly.

For example, the user may use the user interface 11 to cause the control unit 165 to set or change the values of the first (and, if applicable the second) humidity threshold for operating the dehumidifier 105 or can cause the control unit 165 to switch the dehumidifier 105 on and off manually. The user may use the user interface 11 to cause the control unit 165 to set or change the values of the first (and, if applicable the second) soil moisture threshold for operating the watering system 7. In some embodiments of the present invention the user interface 11 can be used by the user to select or adjust the rotation speed of the blades of the fan 30. In some embodiments of the present invention, the user interface 11 is configured to receive from the user a selection of the plant that is contained in the plant pot 15. The user's selection of the plant is received by the control unit, which is configured to cause the watering system 7 to provide water to the selected plant according to the needs (timing and rate of watering, as explained above) of the selected plant.

In some embodiments of the present invention, if not enough water is contained in the water reservoir (as measured by the water level sensor 12), the control unit generates a warning signal and transmits the warning signal to the user interface 11. The user interface 11 includes one or more output devices (such as screen, a speaker, a haptic device) configured to notify the user to water the plant or to add water to the water reservoir for watering the plant. Once the desired quantity of water has been added to the water reservoir (as measured by the water level sensor 12), the control unit 165 operates the watering system 7 to water the plant according to the plant's requirement. In some embodiments of the present invention, the user interface 11 is configured to receive from the user an instruction to water the plant. Responsive to the instruction, the user interface transmits the water instruction of the control unit 165 and the control unit 165 operates the watering system to water the plant.

In some embodiments of the present invention, the concentration of pollutants and/or the air humidity level measured by the air status sensor 8 is transmitted by the control unit 165 to the user interface 11. The user interface 11 includes a screen that displays a list of the detected pollutants and the concentration of the pollutants and/or the humidity level. Optionally, the list of the detected pollutants and the concentration of the pollutants and/or the humidity level are displayed in real time.

The control unit 165 includes a processor and a non-volatile memory unit which stores operation instructions. The processor processes the sensor data and user inputs according to the operation instructions to generate an operation mode for one or more of the watering system 7, the dehumidifier 105, the fan 30, and the light strip 70 (if present), and causes the one or more of the watering system 7, the dehumidifier 105, the fan 30, and the light strip 70 (if present) to operate accordingly.

Figure 14:
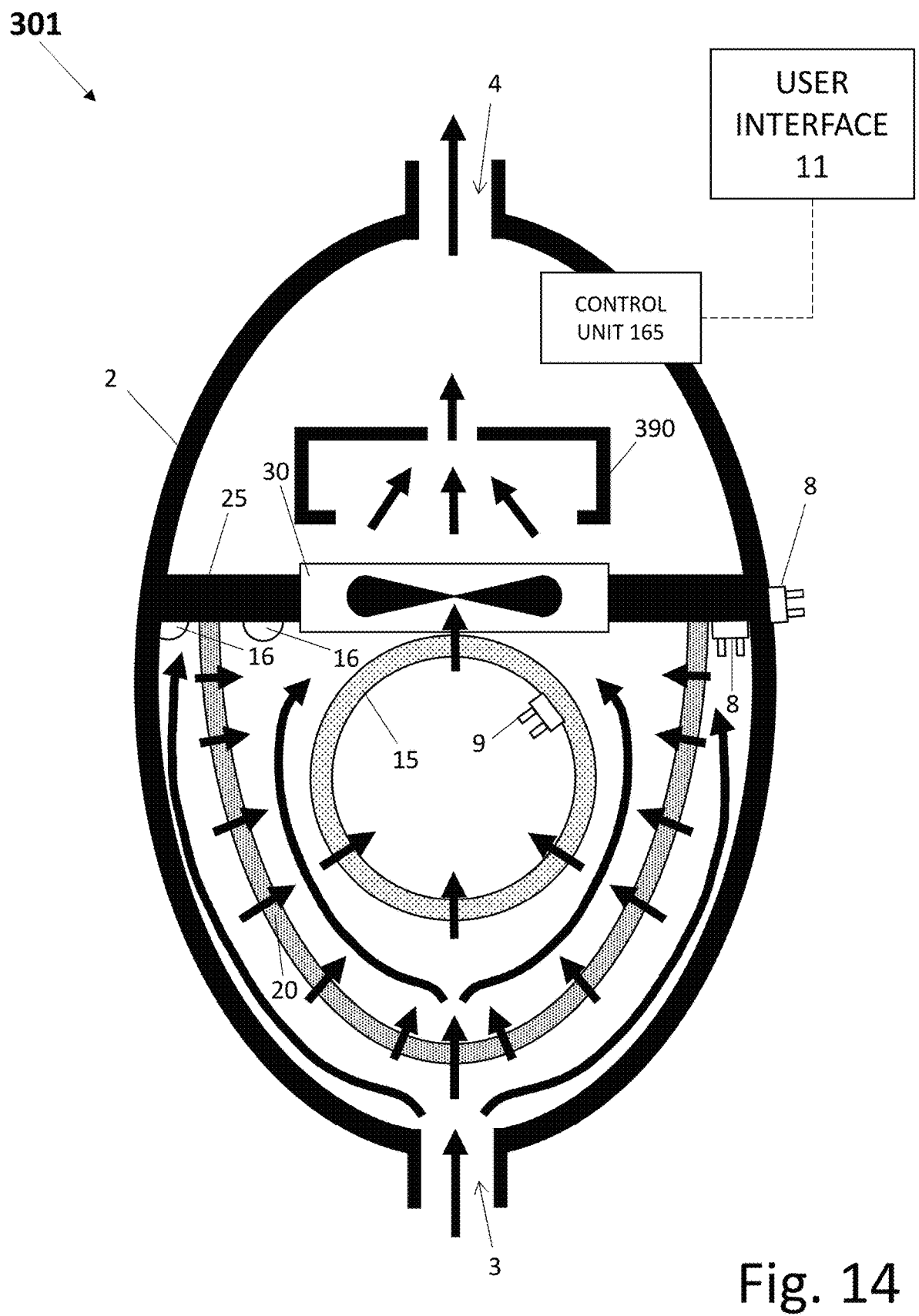
FIG. 14 is a plan view of an air purifier with a humidifier, according to some embodiments of the present invention.

FIG. 14 is a plan view of an air purifier 300 with a humidifier 400, according some embodiments of the present invention.

The air purifier 301 is similar to the air purifier 1 of FIG. 1. However the air purifier 301 does not include a dehumidifier. Rather, a humidifier 390 is disposed between the fan 30 and the outlet 4, and is configured for adding humidity to the air before the air is released into the external environment. This air purifier is configured to add humidity to air that may be too dry for some users. Optionally, the humidifier 390 is activated based on humidity measurements by the air status sensor 8. Optionally, the parameters for activating the humidifier 390 may be set by a user via a user interface 11, as described above.

In some embodiments of the present invention, the air purifier 301 includes a soil moisture sensor 9. As explained above, when the soil moisture level 9 is below a desired threshold, the user interface 11 outputs a notification to the user to water the plant or to add water to the water reservoir (not shown). In some embodiments of the present invention, the air purifier 301 also includes the watering system (not shown) configured to supply water from the water reservoir to the soil, according to the watering requirement of the plant.

In some embodiments of the present invention, the air purifier 301 includes one or more UV light emitters 16 configured for illuminating the air in the air purifier 1. UV light is known to kill certain microbes. The UV light emitters may be, for example, in the space between the inlet 3 and the air purification filter 20, or in the space between the air purification filter 20 and the fan 30.

Figure 15:
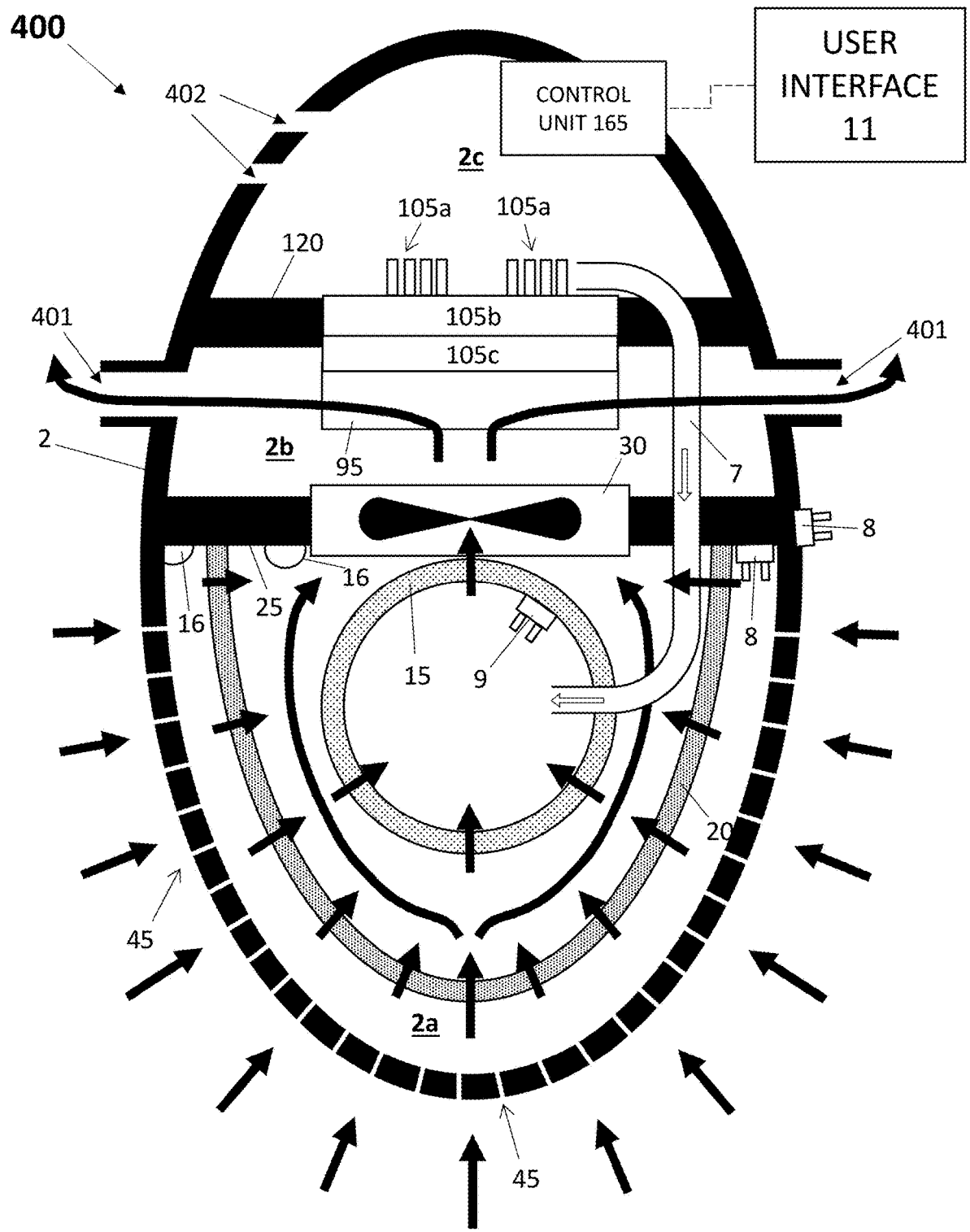
FIG. 15 is a plan view of an air purifier with a dehumidifier, in which the outlet is in the middle chamber, according to some embodiments of the present invention.
Figure 16A:
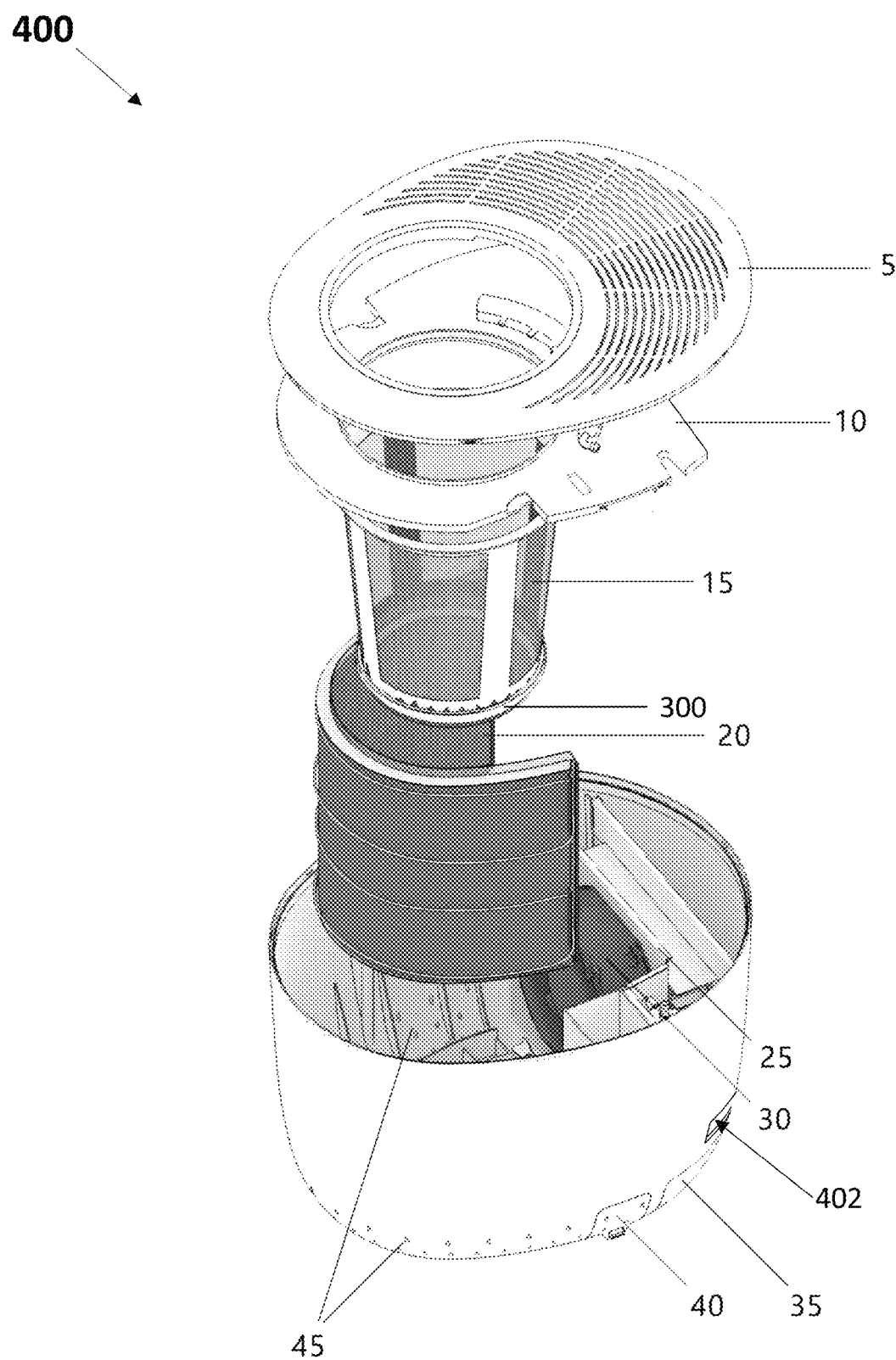
FIG. 16a is an exploded view of the air purifier according to FIG. 15 with a shortened compact lid, according to some embodiments of the present invention.
Figure 16B:
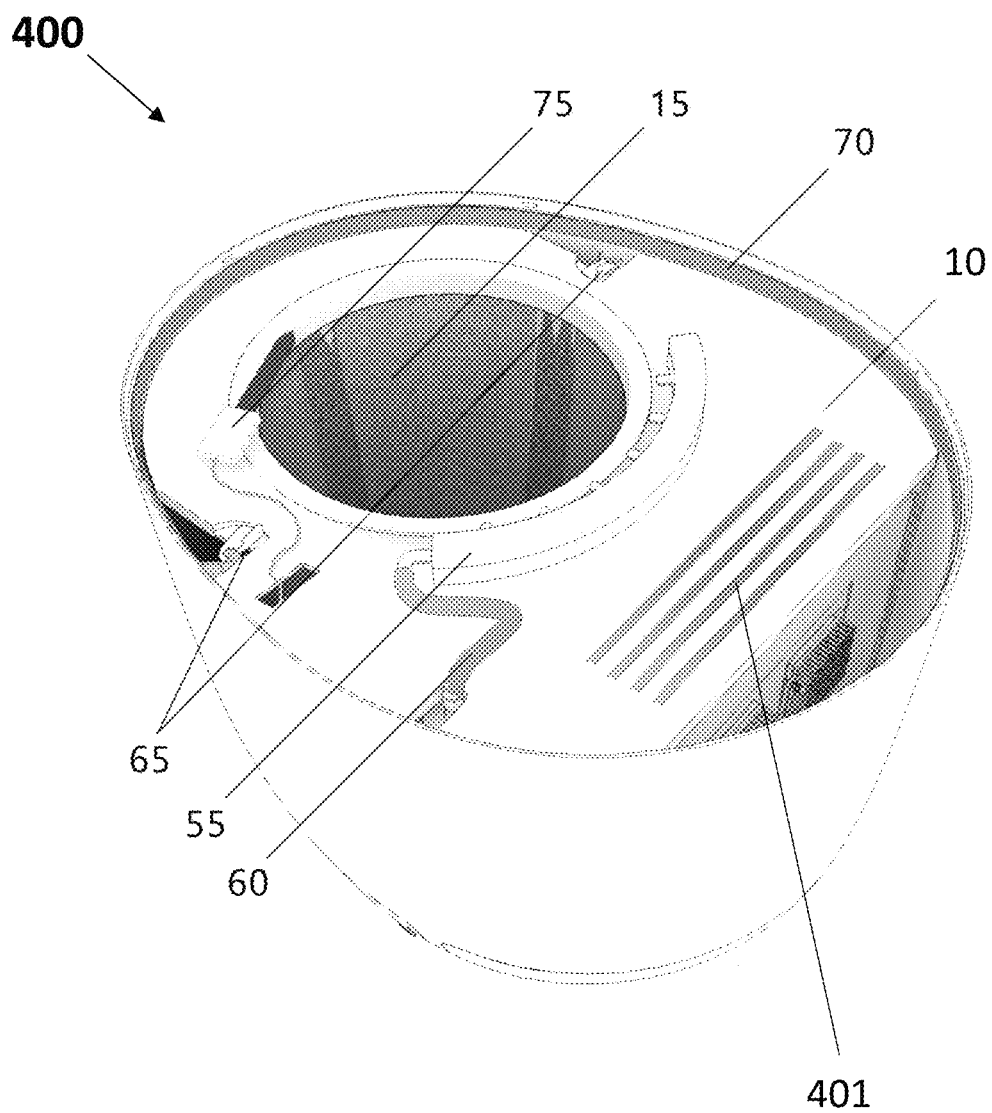
FIG. 16b is a perspective view of an air purifier according to FIG. 16 with a perforated compact lid, according to some employment of the present invention.

FIG. 15 is a plan view of an air purifier 400 similar to the air purifier 201 of FIGS. 2-12. FIG. 16*a* is an exploded view of the air purifier 400 with a shortened compact lid 10. FIG. 16b is a perspective view of an air purifier 400 with a perforated compact lid 10.

The air purifier 400 differs from the air purifier 201 in the fact that in the air purifier 400 the wall 120 does not have any perforations and separates middle chamber 2b from the rear chamber 2c without enabling air passage through the wall 120. In this manner, air driven from the inlets 45 and filtered by passage the air purification filter 20 reaches the middle chamber 2b and exits the housing 2 via one or more middle outlets 401. Before exiting the housing 2, the air still goes through the heat sink 95 to cool the hot plate 105c. The rear chamber 2c includes one or more air exchange perforations 402 configured to enable air exchange between the rear chamber 2c and the external environment outside the housing 2. In this manner, free circulation of air through the air exchange perforations 402 exposes air to the cold plate 105a and causes condensation therethrough. Therefore, in the air purifier 400, the filtering air and the dehumidifying of the air are two independent steps, as the filtered air is not forced to interact with the cold plate 105a of the dehumidifier. The dehumidification of air is not driven by the fan, but occurs via the natural circulation of air in and out of the rear chamber 2c via the air exchange perforations 402.

As shown in FIG. 16a, in some embodiments of the present invention, the compact lid 10 of the air purifier 400 does not cover the middle chamber 2b, nor does it cover the rear chamber 2c. Therefore, the middle outlet 401 is the uncovered top of the middle chamber 2b. The air exchange perforations 402 are the uncovered top of the rear chamber 2c. In some embodiments of the present invention air exchange perforations 402 may also be disposed on the side(s) and/or back of housing 2.

As shown in FIG. 16b, in some embodiments of the present invention, the compact lid 10 of the air purifier 400 covers the middle chamber 2b but includes perforations above the middle chamber 2b. The perforations form the middle outlet 401.

Figure 17:
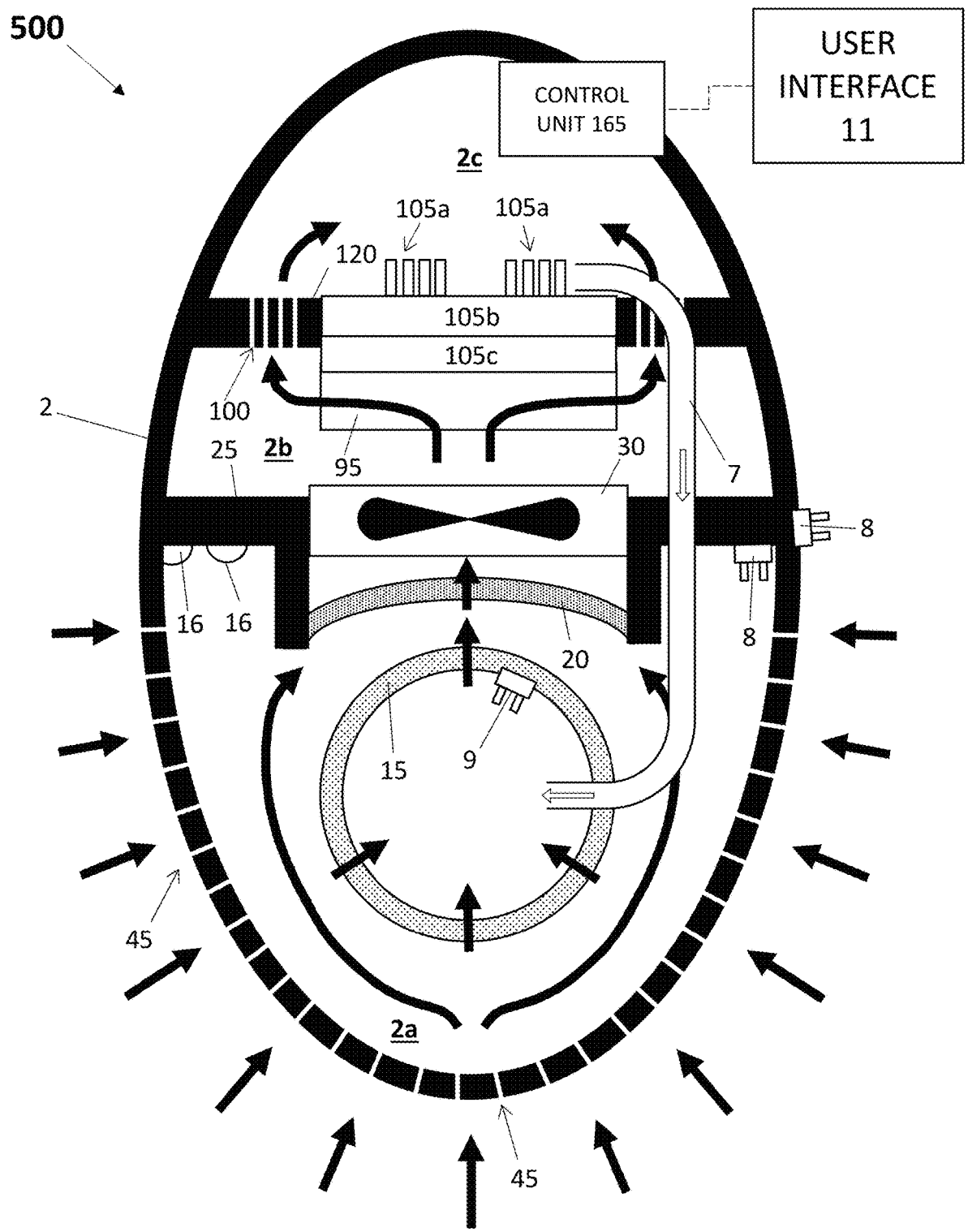
FIG. 17 is plan view of an air purifier in which the air purification filter is disposed between the plant pot and the fan, according to some embodiments of the present invention.
Figure 18:
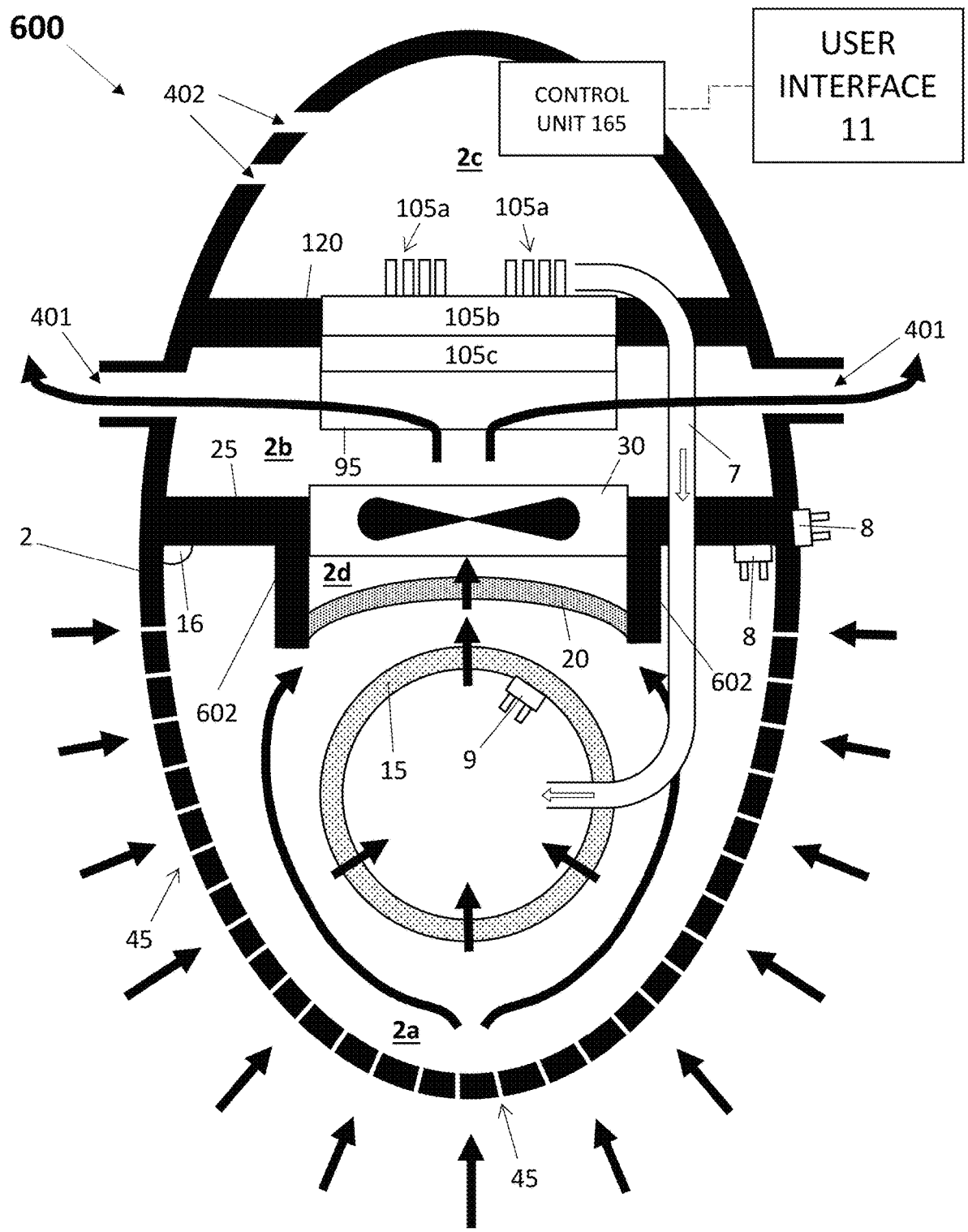
FIG. 18 is plan view of an air purifier in which the air purification filter is disposed between the plant pot and the fan and the outlet is in the middle chamber, according to some embodiments of the present invention.
Figure 19:
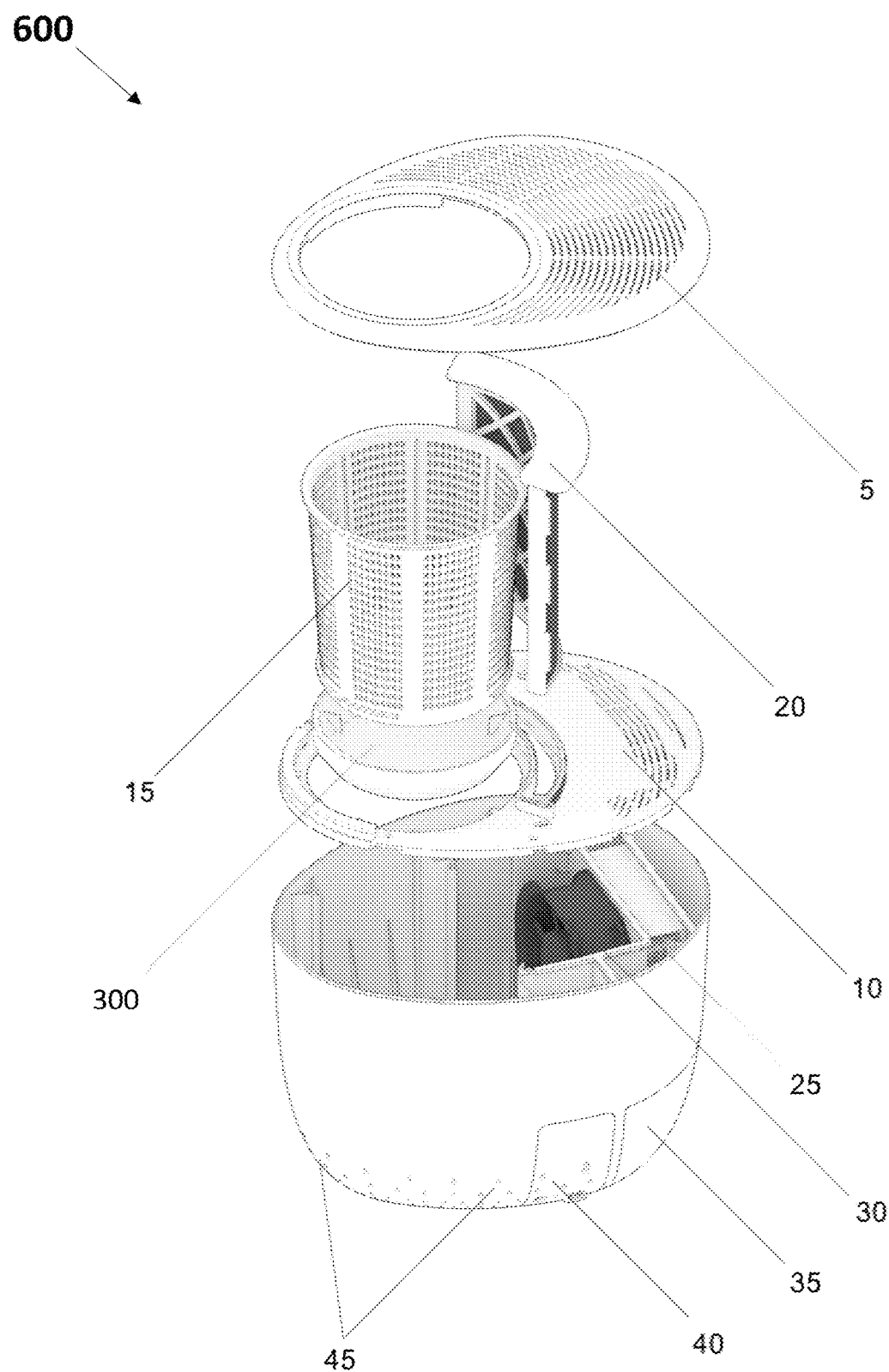
FIG. 19 is an exploded view of the air purifier of FIG. 18, according to some embodiments of the present invention.
Figure 20:
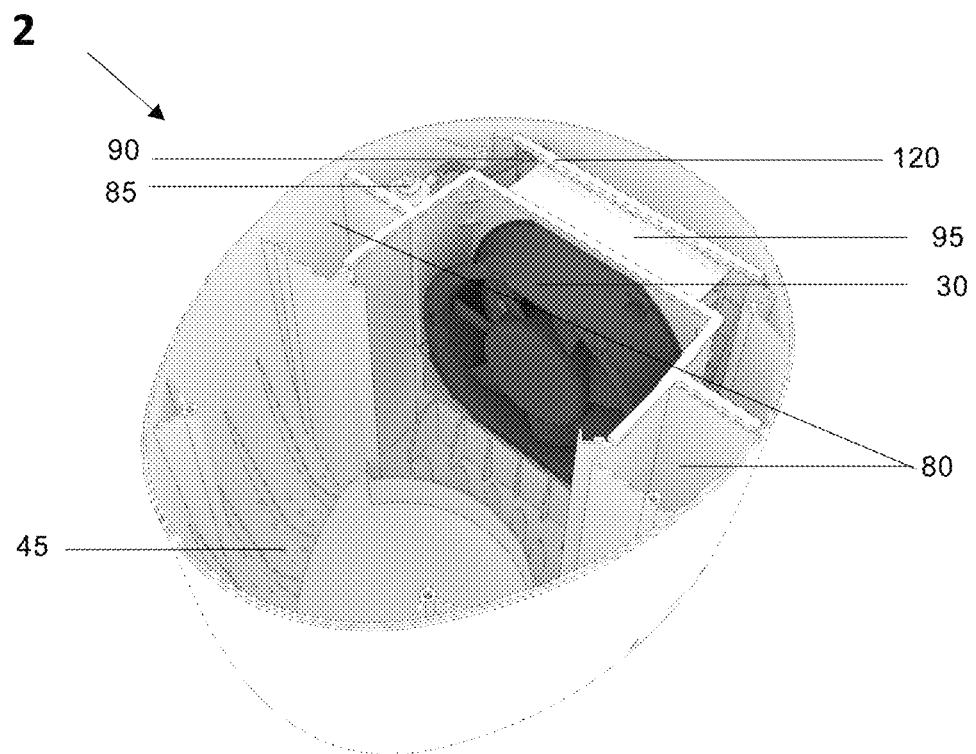
FIG. 20 is perspective view of the housing of the air purifier of FIG. 18, according to some embodiments of the present invention.

FIG. 17 is a plan view of an air purifier 500, which is similar to the air purifier 201 of FIGS. 2-12.

The difference between the air purifier 201 of FIGS. 2-12 and the air purifier 500, lies in the fact that in the air purifier 500, the air purification filter 20 is located downstream of the plant pot 15. Therefore, in the air purifier 500, air is driven by the fan 30 into the front chamber 2a of housing 2 via the perforations 45 (or a different inlet, if any), interacts with the soil and optionally the plant roots in the plant pot 15, is filtered by the air purification filter 20, passes through the fan 30 into the middle chamber 2b, enters the rear chamber 2c via perforations 100 in the wall 120, is dehumidified by being cooled by the cold plate 105a, and exits the housing 2 via an outlet thereof (for example, the uncovered top of the rear chamber 2c).

FIGS. 18-25 refer to an air purifier 600 and components thereof. The air purifier 600 is similar to the air purifier 201 of FIGS. 2-12. The air purifier 600 has two main differences from the air purifier 201.

The first difference lies in the fact that in the air purifier 600 the wall 120 does not have any perforations and separates middle chamber 2b from the rear chamber 2c without enabling air passage through the wall 120. The second difference lies in the fact that in the air purifier 600, the air purification filter 20 is located downstream of the plant pot 15.

Therefore, in the air purifier 600, air is driven by the fan 30 into the front chamber 2a of housing 2 via the perforations 45 (or a different inlet, if any), interacts with the soil and optionally the plant roots in the plant pot 15, is filtered by the air purification filter 20, and passes through the fan 30 into the middle chamber 2b and exits the housing 2 via one or more middle outlets 401. Before exiting the housing 2, the air still goes through the heat sink 95 (if present) to cool the hot plate 105c. The rear chamber 2c includes one or more air exchange perforations 402 configured to enable air exchange between the rear chamber 2c and the external environment outside the housing 2. In this manner, free circulation of air through the air exchange perforations 402 exposes air to the cold plate 105a and causes condensation therethrough.

Therefore, in the air purifier 600, the filtering of the air and the dehumidifying of the air are two independent steps, as the filtered air is not driven by the fan 30 to the cold plate 105a of the dehumidifier. The dehumidification of air is not driven by the fan 30, but occurs via the natural circulation of air in and out of the rear chamber 2c via the air exchange perforations 402.

Figure 21:
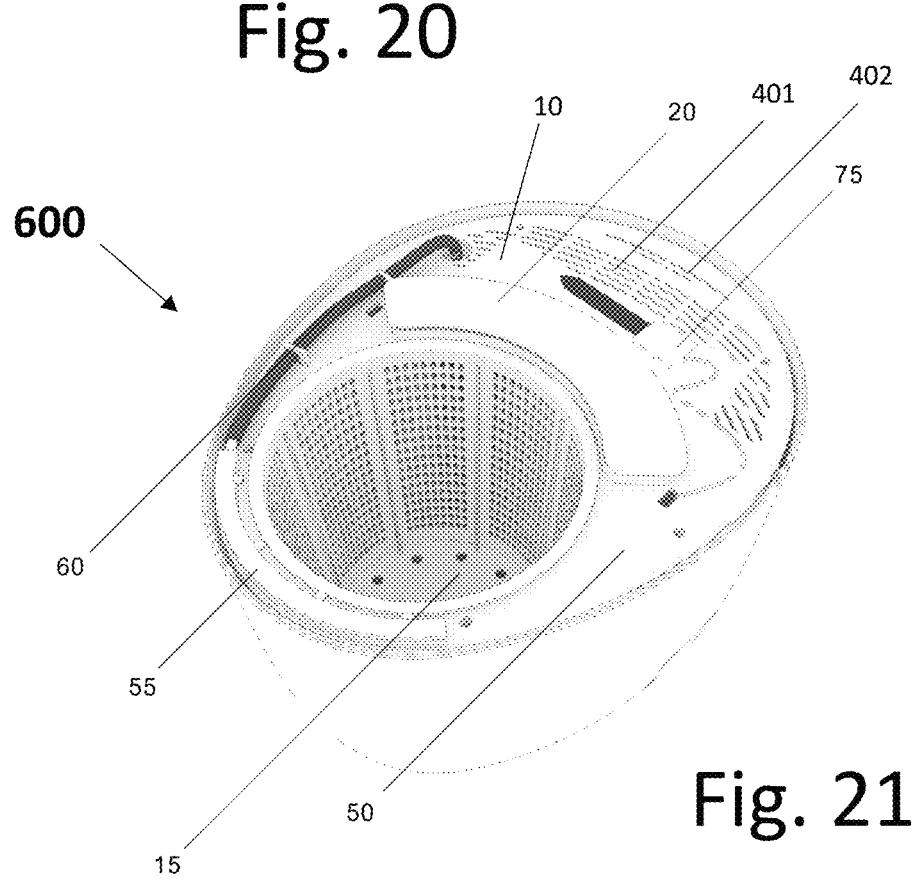
FIG. 21, is a perspective view of the air purifier of FIG. 18, according to some embodiments of the present invention.
Figure 22:
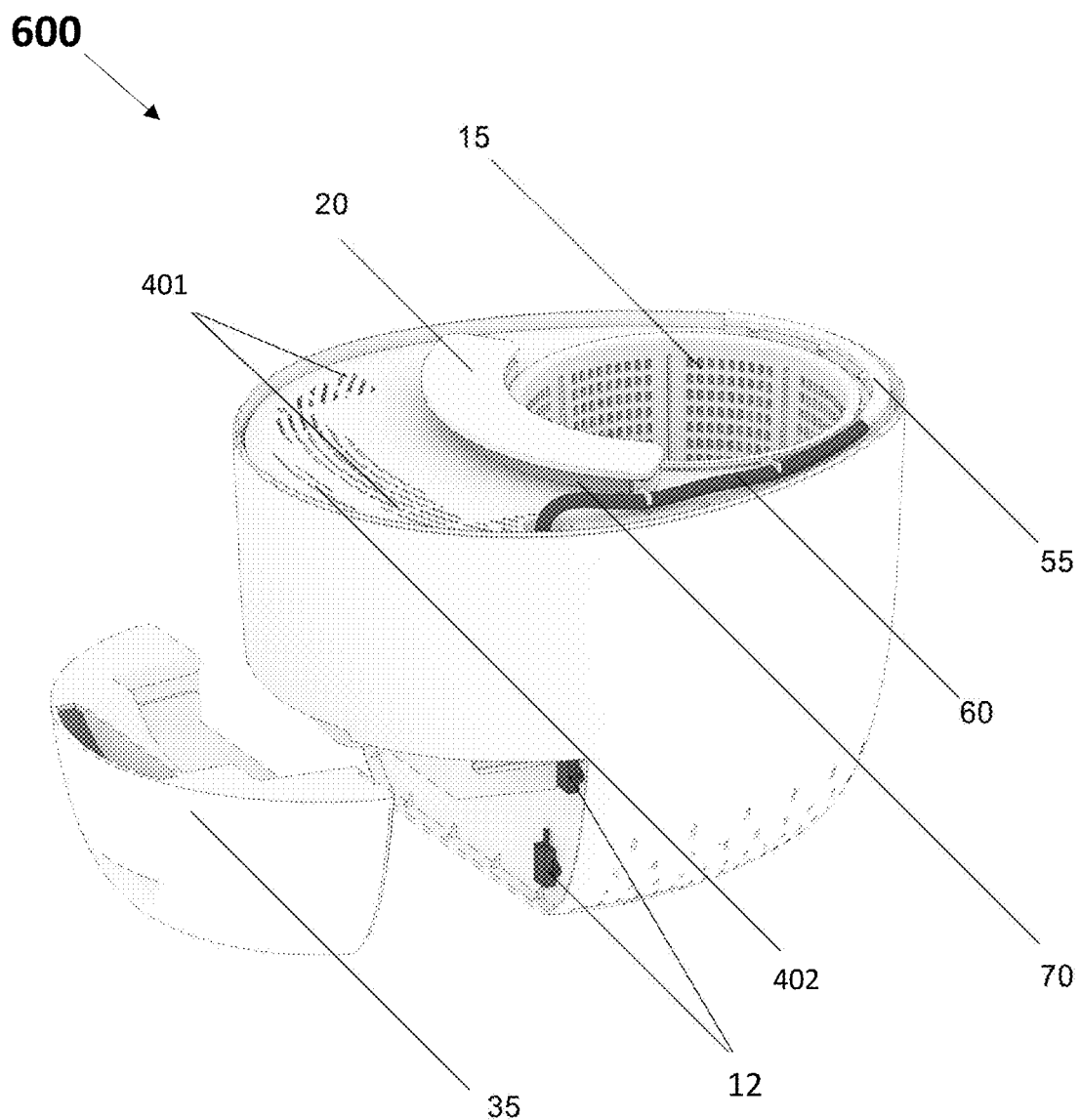
FIG. 22 is a perspective view of the air purifier of FIG. 18, with a removable water reservoir, according to some embodiments of the present invention.
Figure 23:
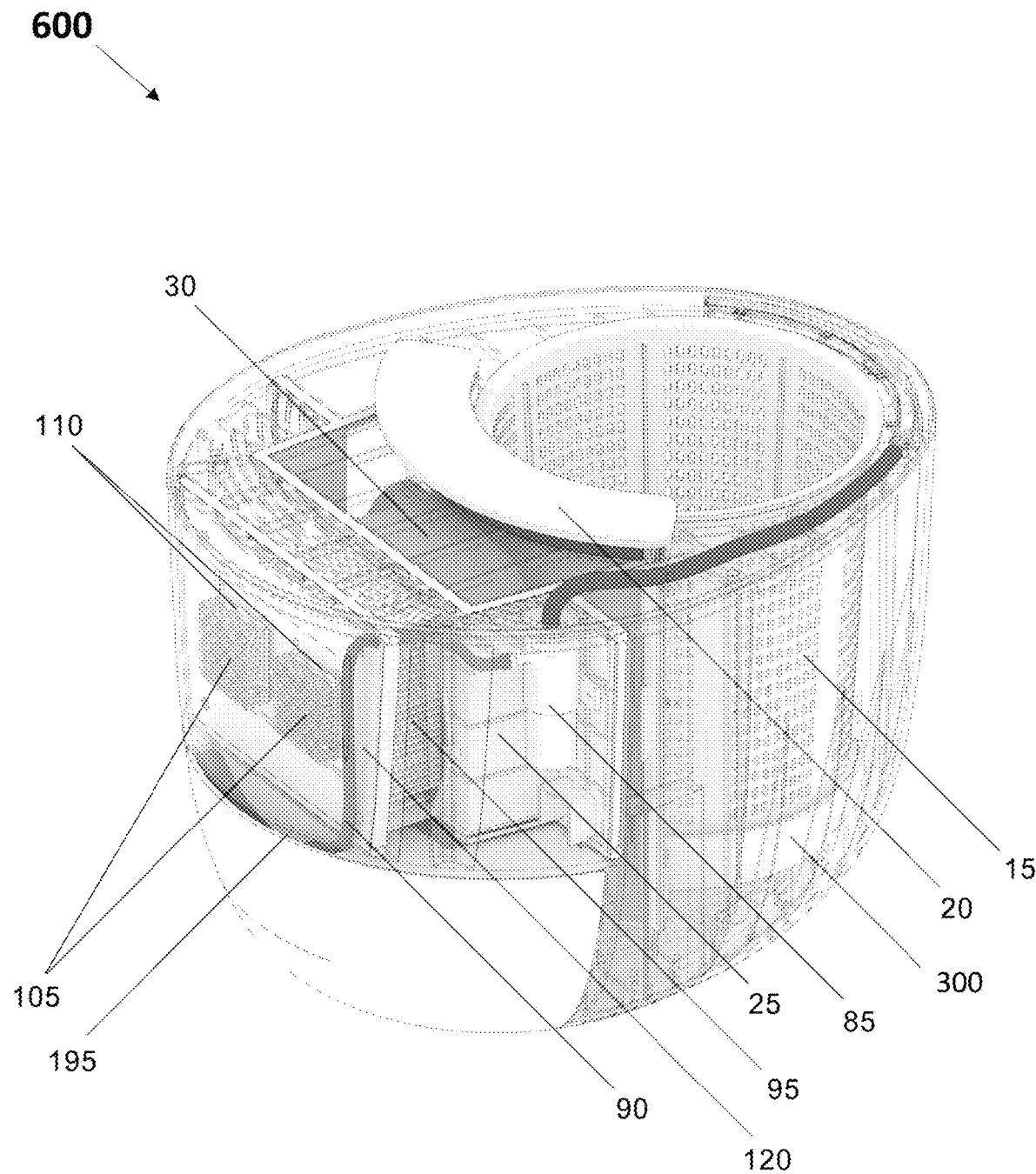
FIG. 23 is a perspective view of the air purifier of FIG. 18, with the housing being shown as semi-transparent, according to some embodiments of the present invention.
Figure 24:
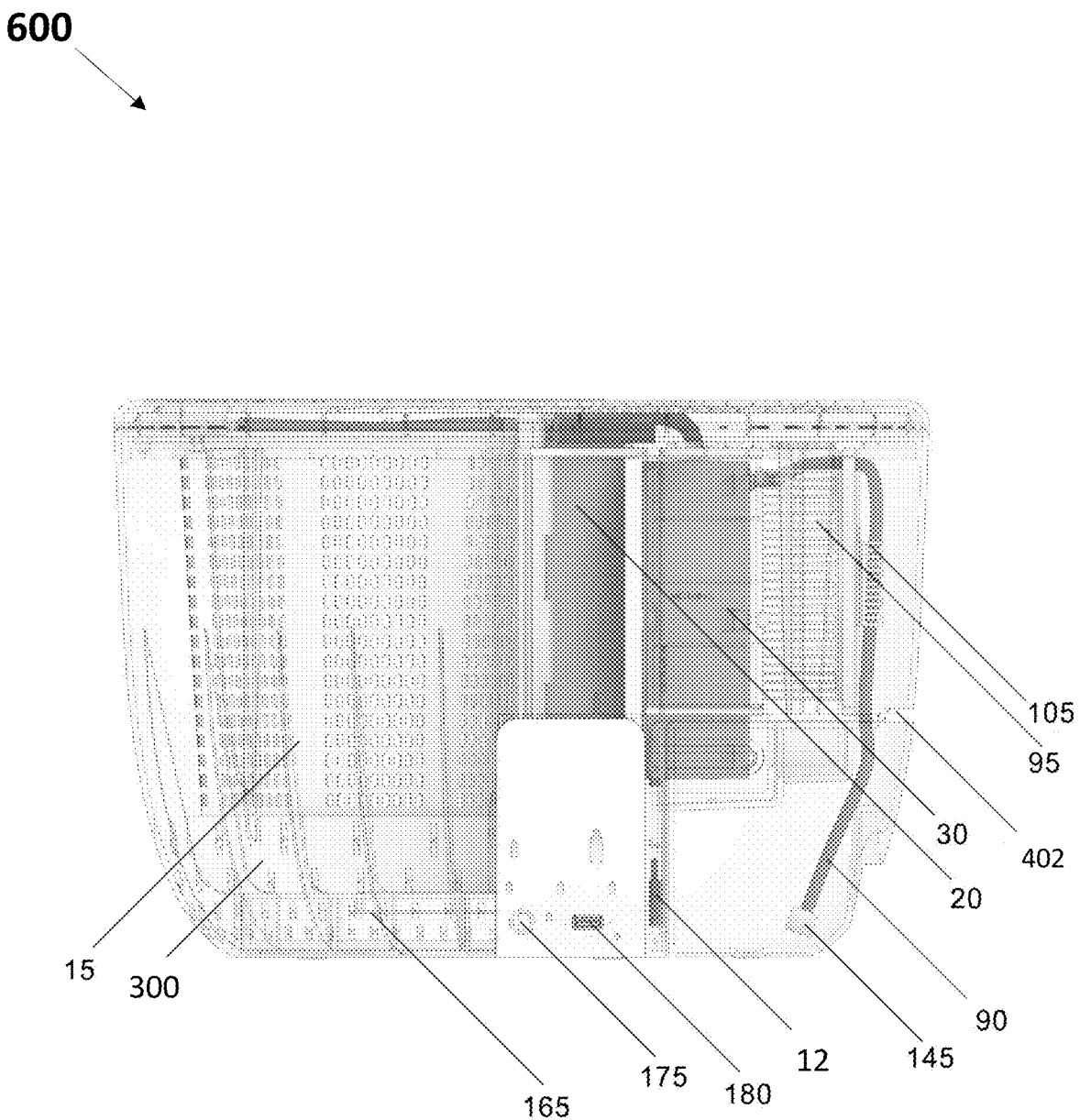
FIG. 24 is a side view of the air purifier of FIG. 18, with the housing being shown as semi-transparent, according to some embodiments of the present invention.
Figure 25:
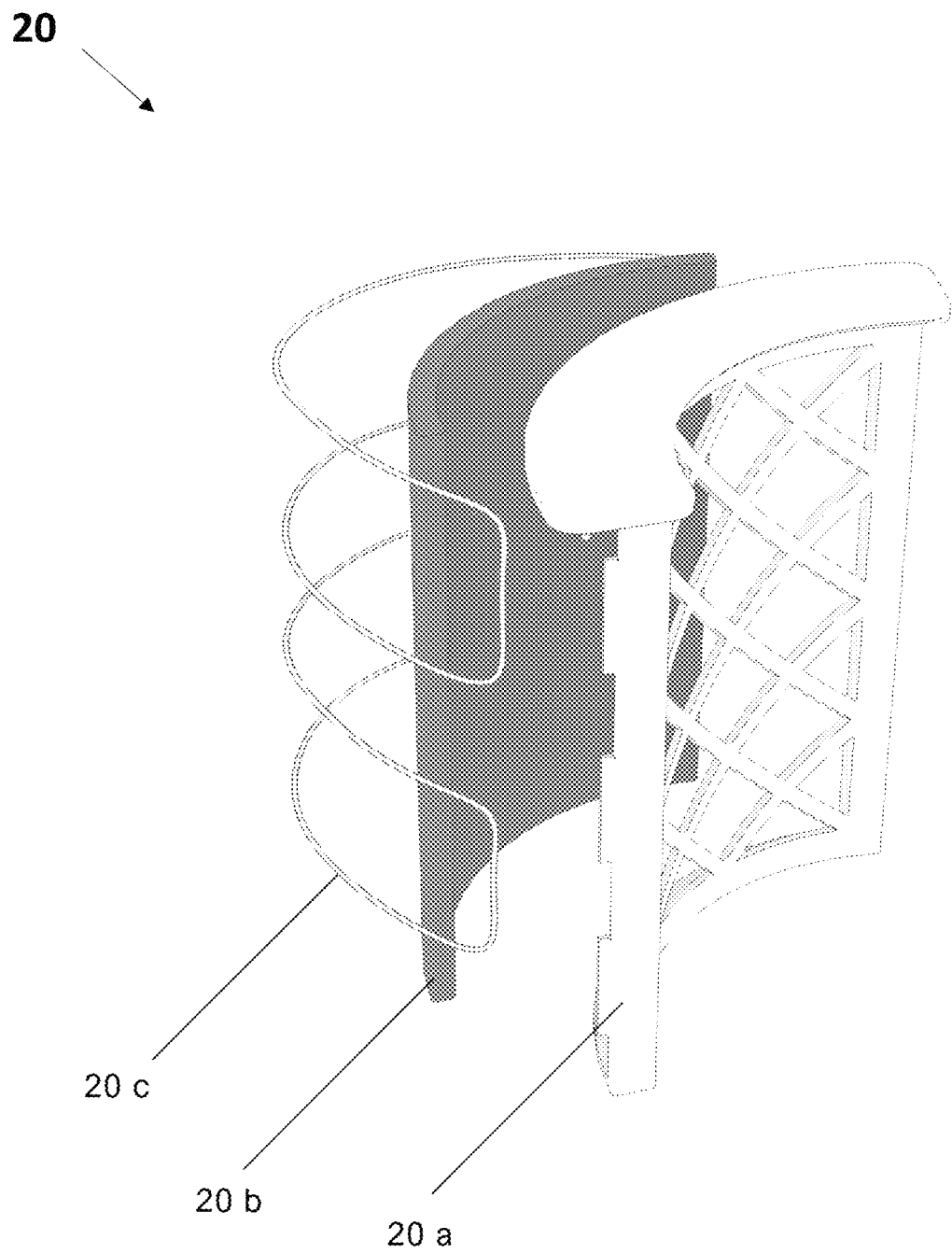
FIG. 25 is an exploded view of the air purification filter of the air purifier of FIG. 18, according to some embodiments of the present invention.

As shown in FIGS. 21-22, in some embodiments of the present invention, the compact lid 10 covers all the chambers, but not the plant pot 15. The middle outlets 401 are in the form of perforations on compact lid 10 above the chamber middle 2b. Therefore, air is exhausted from the middle chamber 2b via the middle outlets 401 on the compact lid. Air exchange perforations 402 are also on the compact lid 10 above the rear chamber 2c. Alternatively or additionally, the air exchange perforations 402 may be disposed on the side(s) and/or back of housing 2, as seen in FIG. 24, to allow air exchange between the external environment outside the housing and the rear chamber 2c for the dehumidification of air.

In some embodiments of the present invention, an intermediate chamber 2d is located between the front chamber 2a and the middle chamber 2b. The intermediate chamber 2d is enclosed on the sides by two side walls 602 extending forward from the first wall 25, on the front by the air purification filter 20, and on the back by the fan 30. The purpose of the intermediate chamber is to properly fit the air purification filter between the plant pot 15 and the fan 30 and minimize the flow of air around the air purification filter 20 before reaching the fan 30. In this manner, air reaching the fan 30 from the front chamber 2a is filtered by the air purification filter 20.

What is claimed is:
1. An air purifier apparatus, comprising:
   a housing comprising an air intake opening to an external environment outside the housing;
   a plant pot disposed downstream of the air intake, the plant pot being configured to hold soil and being perforated so as to enable contact between at least some air outside the plant pot and at least some soil inside the plant pot;
   an air purification filter disposed downstream of the plant pot;
   a fan disposed downstream of the air purification filter;
   an air outlet disposed downstream of the fan and located in a first compartment of the housing;
   a dehumidifier disposed in a second compartment of the housing that is separate from the first compartment, the dehumidifier being configured to extract water from air interacting with the dehumidifier, the second compartment having at least one air exchange perforation opening to the external environment outside the housing;
   a watering system, configured to circulate water located inside the housing to the plant pot;

wherein the fan is arranged to generate an air pressure gradient in the housing and draw air from the external environment through the air intake and downstream through the plant pot and/or around the plant pot, through the air purification filter, and out of the housing through the air outlet.

2. The air purifier apparatus of claim 1, wherein the water located inside the housing comprises the water extracted by the dehumidifier.

3. The air purifier apparatus of claim 1, wherein:
the housing comprises:
a front chamber having a plurality of first perforations, the first perforations forming the air intake;
a middle chamber separated from the front chamber by a first wall, the first wall having a first opening, the fan being installed in the first opening, the middle chamber forming the first compartment;
a rear chamber separated from the middle chamber by a second wall, the rear chamber forming the second compartment;
wherein the dehumidifier is located in the rear chamber;
wherein a top of the middle chamber is at least partially uncovered, thereby forming the air outlet;
wherein the fan is configured to drive the air from the external environment into the front chamber through the first perforations, then through the air purification filter, then through the fan into middle chamber, then out of the middle chamber via the top of the middle chamber, such that at least some of the air entering the housing via the first perforations is configured to interact with soil and/or a root of a plant held in the plant pot and to be filtered by interaction with soil and/or by a root of a plant held in the plant pot before passing through the air purification filter, and such that the air purification filter is configured to remove at least some particles from the air passing therethrough.

4. The air purifier apparatus of claim 3, wherein the second wall comprises a second opening and the dehumidifier comprises a Peltier dehumidifier covering the second opening and comprising:
a warm plate facing the middle chamber; and
a cold plate facing and partially extending into the rear chamber, such that the air in the rear chamber contacts the cold plate, causing water vapor in the air to condense into the water thereby reducing a humidity of the air in the rear chamber, such that the water drips onto a water reservoir at a bottom of the rear chamber.

5. The air purifier apparatus of claim 4, comprising a heat sink joined to the warm plate and extending inside the middle chamber, such that the air flows through the heat sink before being driven out of the housing and thereby cools the warm plate.

6. The air purifier apparatus of claim 1, further comprising an air status sensor, configured to measure a humidity of the air either inside the housing or outside the housing, wherein the dehumidifier is configured to be activated when the measured humidity of the air is above a first threshold and deactivated when the measured humidity falls below a second threshold, wherein:
the first threshold and the second threshold are equal to each other; or
the first threshold is higher than the second threshold.

7. The air purifier apparatus of claim 1, comprising a water reservoir below the dehumidifier, the water reservoir being configured to collect the water extracted by the dehumidifier;
wherein the watering system comprises a water pump configured to pump water from the water reservoir into the plant pot to water a plant held in the plant pot.

8. The air purifier apparatus of claim 7, wherein the water reservoir is removably joined to the housing.

9. The air purifier apparatus of claim 1, comprising a soil moisture sensor configured to measure a soil moisture in soil held by the plant pot, wherein the watering system is configured to be activated to drive the water to the plant pot if the soil moisture falls below a first threshold and deactivated if the soil moisture rises above a second threshold, wherein:
the first threshold and the second threshold are equal to each other; or
the first threshold is lower than the second threshold.

10. The air purifier apparatus of claim 1, further comprising soil and a plant held by the plant pot, wherein the fan is configured to drive some air from the air intake through the soil and from the soil to the air purification filter.

11. The air purifier apparatus of claim 1, further comprising:
an air status sensor, configured to measure humidity of the air before the air reaches the dehumidifier and to generate first sensor data indicative of the humidity of the air;
a soil moisture sensor, configured to measure a moisture level of soil held in the plant pot and to generate second sensor data indicative of the moisture of soil held in the plant pot;
a user interface, configured for receiving one or more instructions from the user; and
a control unit configured to:
receive the first sensor data, the second sensor data, and the one or more instructions;
process the first sensor data, the second sensor data, and the one or more instructions;
control an operation of the dehumidifier according to the first sensor data and the one or more instructions; and
control an operation of the watering system according to the second sensor data and the one or more instructions.

12. The air purifier apparatus of claim 11, wherein:
the one or more instructions comprise a selection of a plant contained in the plant pot from a plurality of predetermined plants;
the control unit is configured to store watering data indicative of watering requirements of the plurality of predetermined plants and is configured to control the operation of the watering system according to the watering requirement of the selected plant and to the soil moisture level.

13. The air purifier apparatus of claim 12, wherein the watering data is indicative of a desired soil moisture and a desired speed for providing water to soil held in the plant pot.

14. The air purifier apparatus of claim 12, comprising a water level sensor configured to measure a water quantity in the housing and to generate third sensor data indicative of the water quantity in the housing, wherein:
the control unit is configured to calculate a desired water quantity in the housing based on the soil moisture level and the watering requirements of the selected plant;
the control unit is configured to compare the desired water quantity to the water quantity in the housing provided by the water level sensor;

if the water quantity in the housing is less than the desired water quantity, the control unit is configured to generate an alert signal and to transmit the alert signal to the user interface;

responsive to the alert signal, the user interface is configured to output a notification to the user to add water to the housing; and if the water quantity is brought up to at least the desired water quantity or if the soil moisture level is increased to a desired soil moisture, the control unit is configured to stop generating the alert signal, and the user interface is configured to stop outputting the notification in response to a lack of the alert signal.

15. The air purifier apparatus of claim 11, wherein:

the one or more instructions include a desired rotation speed of one or more blades of the fan; and the control unit is configured to change a rotation speed of the one or more blades of the fan according to the one or more instructions.

\* \* \* \* \*